(12) United States Patent
Yao et al.

(10) Patent No.: US 10,656,748 B2
(45) Date of Patent: May 19, 2020

(54) FORCE SENSOR AND METHOD OF MANUFACTURING THE SAME, TOUCH PANEL AND TOUCH DISPLAY PANEL

(71) Applicants: BOE Technology Group Co., Ltd., Beijing (CN); BEIJING BOE DISPLAY TECHNOLOGY CO., LTD., Beijing (CN)

(72) Inventors: Zhixiao Yao, Beijing (CN); Haifeng Yu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 31 days.

(21) Appl. No.: 15/936,639

(22) Filed: Mar. 27, 2018

(65) Prior Publication Data

US 2019/0114016 A1   Apr. 18, 2019

(30) Foreign Application Priority Data

Oct. 16, 2017   (CN) .......................... 2017 1 0959004

(51) Int. Cl.
   *G06F 3/041*   (2006.01)

(52) U.S. Cl.
   CPC .......... *G06F 3/0414* (2013.01); *G06F 3/0412* (2013.01); *G06F 3/04144* (2019.05); *G06F 3/04164* (2019.05); *G06F 2203/04103* (2013.01)

(58) Field of Classification Search
   CPC .............. G06F 3/0414; G06F 3/04144; G06F 3/04164; G06F 3/0412; G06F 2203/04103
   See application file for complete search history.

(56) References Cited

U.S. PATENT DOCUMENTS 7,538,760 B2 *   5/2009   Hotelling .............. G06F 3/0414
                                                    178/18.06
9,222,846 B2   12/2015   Lim et al.
(Continued)

FOREIGN PATENT DOCUMENTS

CN   102047200 A   5/2011
CN   103852088 A   6/2014
(Continued)

OTHER PUBLICATIONS

First Office Action, including Search Report, for Chinese Patent Application No. 201710959004.6, dated Jan. 6, 2020, 26 pages.

*Primary Examiner* — Nitin Patel
*Assistant Examiner* — Amy Onyekaba
(74) *Attorney, Agent, or Firm* — Westman, Champlin & Koehler, P.A.

(57) ABSTRACT

The disclosure provides a force sensor and a method of manufacturing the same, a touch panel and a touch display panel. The force sensor includes opposite first and second substrates, and a sensing electrode and a directional electrode arranged on the first and second substrates respectively, the first substrate is movable relative to the second substrate when being applied by a touch action with a force tending to incur a horizontal movement, to enable a relative movement between the sensing electrode and the directional electrode corresponding to at least one of a direction and a magnitude of the force and changing a relative position of the sensing electrode relative to the directional electrode, and the sensing electrode is configured to generate a sensing signal associated with the relative position and for determining a touch position and at least one of the direction and the magnitude of the force applied at the touch position.

18 Claims, 10 Drawing Sheets

(56) References Cited

U.S. PATENT DOCUMENTS

| | | | |
|---|---|---|---|
| 10,310,658 B2 | 6/2019 | Hou | |
| 2011/0043491 A1* | 2/2011 | Oh | G06F 3/0234 345/177 |
| 2013/0229357 A1* | 9/2013 | Powell | G06F 3/0421 345/173 |
| 2014/0078080 A1* | 3/2014 | Kim | G06F 3/044 345/173 |
| 2014/0150572 A1* | 6/2014 | Lim | G01L 1/142 73/862.626 |
| 2014/0354587 A1* | 12/2014 | Mohindra | G06F 3/044 345/174 |
| 2015/0212633 A1* | 7/2015 | Yamagishi | G06F 3/044 345/174 |
| 2016/0034087 A1* | 2/2016 | Kim | G06F 3/044 345/173 |
| 2016/0035290 A1* | 2/2016 | Kim | G06F 3/0412 345/174 |
| 2016/0062500 A1* | 3/2016 | Kessler | G06F 3/0414 345/174 |
| 2016/0139701 A1* | 5/2016 | Wang | G06F 3/046 345/174 |
| 2016/0162088 A1 | 6/2016 | Kim et al. | |
| 2016/0188039 A1* | 6/2016 | Yoon | G06F 3/044 345/174 |
| 2016/0370924 A1 | 12/2016 | Hou | |
| 2017/0220183 A1* | 8/2017 | Kim | G06F 3/0412 |

FOREIGN PATENT DOCUMENTS

| | | |
|---|---|---|
| CN | 104503627 A | 4/2015 |
| CN | 205068355 U | 3/2016 |
| CN | 105866995 A | 8/2016 |
| CN | 106484188 A | 3/2017 |

\* cited by examiner

FORCE SENSOR AND METHOD OF MANUFACTURING THE SAME, TOUCH PANEL AND TOUCH DISPLAY PANEL

CROSS-REFERENCE TO RELATED APPLICATION

This application claims the priority benefit of the Chinese Patent Application No. 201710959004.6 filed on Oct. 16, 2017 in the State Intellectual Property Office of China, the whole disclosure of which is incorporated herein by reference.

TECHNICAL FIELD

Embodiments of the present disclosure generally relate to the field of display technology, and particularly to a force sensor and a method of manufacturing the same, a touch panel and a touch display panel.

DESCRIPTION OF THE RELATED ART

Recently, touch display panel has become the easiest human-computer interactive electronic device, which has a touch function and a display function incorporated therein and may be widely applied in current portable electronic apparatuses such as a smartphone, a tablet computer, a notebook computer, or the like.

The touch panel, regardless of having a capacitive screen or a resistive screen, is configured for determining a two-dimensional position of a touch point. With rapid development of technologies, some existing touch panels have been provided with a pressure sensing function for further enriching diversity in the human-computer interaction and for further improving user's experience in the human-computer interaction. The touch panel having pressure sensing function is also called as a pressure sensitive touch panel or a force touch panel, which may sense a touch pressure while sensing a touch position, so that a corresponding function may be invoked or a corresponding display operation may be implemented according to the position of the touch point and the sensed pressure at the touch point, thereby the touch control technology may be extended to the three-dimension (3D) domain.

So far, although there have been proposed many force touch solutions, the sensed force is limited to the pressure in a direction perpendicular to the touch panel and a horizontal force in a direction parallel to the touch panel can not be sensed.

SUMMARY

In order to overcome or eliminate at least one of the above and other problems and defects in prior arts, the present disclosure is made.

In an aspect, an embodiment of the present disclosure provides a force sensor, comprising a first substrate and a second substrate opposite to each other, a sensing electrode on one of the first substrate and the second substrate, and a directional electrode on the other of the first substrate and the second substrate, the first substrate is movable relative to the second substrate in response to being applied with a force by a touch action from a touch object and tending to incur a horizontal movement, so as to enable a relative movement between the sensing electrode and the directional electrode corresponding to at least one of a direction and a magnitude of the force and changing a relative position of the sensing electrode with respect to the directional electrode, and the sensing electrode is configured to generate, under induction of a voltage signal applied to the directional electrode, a sensing signal associated with the relative position and used for determining a touch position of the touch action and at least one of the direction and the magnitude of the force applied by the touch action at the touch position.

In some embodiments, one said sensing electrode is on a surface of the first substrate facing the second substrate while a plurality of said directional electrodes are on a surface of the second substrate facing the first substrate; or, a plurality of said directional electrodes are on the surface of the first substrate facing the second substrate while one said sensing electrode is on the surface of the second substrate facing the first substrate; the plurality of directional electrodes are symmetrical about the sensing electrode as a center; and the sensing electrode is configured to, under induction of the voltage signal applied to the directional electrode and in response to a movement of the first substrate relative to the second substrate under the force, generate, by sensing a distance between the sensing electrode and the directional electrode, the sensing signal for determining the touch position of the touch action and at least one of the direction and the magnitude of the force applied at the touch position.

In some embodiments, the force sensor further comprises a plurality of scan leading-out lines for applying different voltage signals to the plurality of directional electrodes respectively and a sense leading-out line for acquiring the sensing signal from the sensing electrode, the sense leading-out line being electrically connected with the sensing electrode, each of the plurality of scan leading-out lines being electrically connected with one of the plurality of directional electrodes.

In some embodiments, the number of the plurality of directional electrodes is in a range from two to eight.

In some embodiments, one said directional electrode is on a surface of the first substrate facing the second substrate while a plurality of said sensing electrodes are on a surface of the second substrate facing the first substrate; or, a plurality of said sensing electrodes are on the surface of the first substrate facing the second substrate while one said directional electrode is on the surface of the second substrate facing the first substrate; the plurality of sensing electrodes are symmetrical about the directional electrode as a center; and the sensing electrode is configured to, under induction of the voltage signal applied to the directional electrode and in response to movement of the first substrate relative to the second substrate under the force, generate, by sensing a distance between the sensing electrode and the directional electrode, the sensing signal for determining the touch position of the touch action and at least one of the direction and the magnitude of the force applied at the touch position.

In some embodiments, the force sensor further comprises a scan leading-out line for applying the voltage signal to the directional electrode and a plurality of sense leading-out lines for acquiring sensing signals from the plurality of sensing electrodes respectively, each of the plurality of sense leading-out lines being electrically connected with one of the plurality of sensing electrodes, the scan leading-out line being electrically connected with the directional electrode.

In some embodiments, the number of the plurality of sensing electrodes is in a range from two to eight.

In some embodiments, the plurality of scan leading-out lines and the sense leading-out line are on the first substrate or the second substrate; and the sense leading-out line is electrically connected with the sensing electrode by a sensing connection electrode, and each of the plurality of scan leading-out lines is electrically connected with one of the plurality of directional electrodes by a scan connection electrode.

In some embodiments, the scan leading-out line and the plurality of sense leading-out lines are on the first substrate or the second substrate; and each of the plurality of the sense leading-out lines is electrically connected with one of the plurality of the sensing electrodes by a sensing connection electrode, and the scan leading-out line is electrically connected with the directional electrode by a scan connection electrode.

In some embodiments, the force sensor further comprises a lubrication layer on the first substrate or the second substrate and for reducing a friction for the relative movement between the first substrate and the second substrate, the lubrication layer being in contact with the sensing electrode or the directional electrode on one of the first substrate and the second substrate opposite to the lubrication layer.

In some embodiments, the force sensor further comprises a dielectric layer, the dielectric layer being on the first substrate or the second substrate and comprising a plurality of dielectric blocks, each of the plurality of dielectric blocks being between the sensing electrode and the directional electrode.

In some embodiments, the force sensor further comprises an insulation layer on the first substrate or the second substrate, the insulation layer being at an outer side of the sensing electrode or the directional electrode.

In some embodiments, at least one of the sensing electrode and the directional electrode is a columnar electrode extending between the first substrate and the second substrate.

In another aspect, an embodiment of the present disclosure provides a touch panel comprising a plurality of the force sensors described in any of embodiments of the present disclosure and arranged in an array, the touch panel further comprises: a scanning circuit configured to input a voltage signal to each of the plurality of said force sensors in a scanning mode; and a sensing circuit configured to acquire a sensing signal from each of the plurality of said force sensors, and to determine, according to the sensing signal, a touch position of a touch object on the touch panel and at least one of a direction and a magnitude of a force applied by the touch object at the touch position and tending to incur a horizontal movement.

In a further aspect, an embodiment of the present disclosure provides a touch display panel comprising a display panel and the touch panel described in any of embodiments of the present disclosure.

In a yet another aspect, an embodiment of the present disclosure provides a method of manufacturing a force sensor, comprising:

providing a first substrate and a second substrate, and forming a sensing electrode on one of the first substrate and the second substrate and a directional electrode on the other of the first substrate and the second substrate;

aligning and engaging the first substrate and the second substrate with each other, such that the first substrate is movable relative to the second substrate in response to being applied with a force by a touch action from a touch object and tending to incur a horizontal movement, so as to enable a relative movement between the sensing electrode and the directional electrode corresponding to at least one of a direction and a magnitude of the force and changing a relative position of the sensing electrode with respect to the directional electrode, the sensing electrode being configured to generate, under induction of a voltage signal applied to the directional electrode, a sensing signal associated with the changed relative position and used for determining a touch position of the touch action and at least one of the direction and the magnitude of the force applied at the touch position.

In some embodiments, forming a sensing electrode on one of the first substrate and the second substrate and a directional electrode on the other of the first substrate and the second substrate comprises:

forming one said sensing electrode on one of the first substrate and the second substrate and forming a plurality of said directional electrodes on the other of the first substrate and the second substrate; or, forming one said directional electrode on one of the first substrate and the second substrate and forming a plurality of said sensing electrodes on the other of the first substrate and the second substrate.

In some embodiments, the method further comprises: forming a lubrication layer on the first substrate or the second substrate, the lubrication layer being configured for reducing a friction for the relative movement between the first substrate and the second substrate.

In some embodiments, the method further comprises: on the other of the first substrate and the second substrate on which the directional electrode is to be formed, forming a scanning signal transmission layer for applying the voltage signal to the directional electrode and a sensing signal transmission layer for acquiring and transmitting the sensing signal from the sensing electrode;

forming the directional electrode on the scanning signal transmission layer; and forming a dielectric layer and an insulation layer, the dielectric layer and the insulation layer being arranged such that after aligning and engaging the first substrate and the second substrate with each other, the dielectric layer is located between the sensing electrode and the directional electrode, and the insulation layer is located at an outer side of the sensing electrode or the directional electrode.

In some embodiments, aligning and engaging the first substrate and the second substrate with each other comprises:

aligning and engaging the first substrate and the second substrate with each other with surfaces of the first substrate and the second substrate on which the sensing electrode and the directional electrode are formed respectively facing towards each other, such that the plurality of said directional electrodes are arranged symmetrically about the one said sensing electrode as a center or the plurality of said sensing electrodes are arranged symmetrically about the one said directional electrode as a center, thereby under induction of the voltage signal applied to the directional electrode and in response to movement of the first substrate relative to the second substrate under the force, the sensing electrode generates, by sensing a distance between the sensing electrode and the directional electrode, the sensing signal for determining the touch position of the touch action and at least one of the direction and the magnitude of the force applied at the touch position.

BRIEF DESCRIPTION OF THE DRAWINGS

The drawings are provided for further understanding of technique schemes of the present disclosure, and constitute a part of the specification so as to illustrate, in conjunction with embodiments of the present application, the technique schemes of the present disclosure, rather than being limitative to the technique schemes of the present disclosure. Shapes and sizes of parts in the drawings are not drawn in real scales and are only intended to schematically illuminate contents of the present disclosure.

FIG. 5b is a cross sectional view of the arrangement shown in FIG. 5a;

FIG. 6b is a cross sectional view of the arrangement shown in FIG. 6a;

FIG. 7b is a cross sectional view of the configuration shown in FIG. 7a;

FIG. 8b is a cross sectional view of the configuration shown in FIG. 8a;

FIG. 9b is a cross sectional view of the configuration shown in FIG. 9a;

FIG. 17b is a cross sectional view showing the arrangement shown in FIG. 17a;

FIG. 18b is a cross sectional view showing the arrangement shown in FIG. 18a.

DETAILED DESCRIPTION OF PREFERRED EMBODIMENTS

Exemplary embodiments of the present disclosure will be further described in detail below, with reference to the accompanying drawings. The following embodiments are illustrative to the present disclosure, rather than being limitative to scopes of the present disclosure. It is noted that embodiments and features thereof in the present application may be combined in a random way without conflicting.

It is found under study that richer information may be obtained from an action of a finger pressing a touch panel. For example, when the finger is intended to move towards a certain direction from a pressing position, due to presence of static friction, a direction of a force applied by the finger will show a tendency to move towards the direction before the finger is actually moved from the pressing position. That is, when the finger touches the touch panel, the finger may also show a tendency to move towards a certain direction even if it is stationary. Thus, recognition of a touch intention of a user may be achieved by sensing a force applied by the finger and tending to incur a horizontal movement or in a direction parallel to the touch panel. Obviously, the user may make a touch operation reflecting such intention without moving away from the touch position, thereby diversity in the human-computer interaction may be greatly enriched and the touch control technology may be extended to a multi-dimension domain.

Based on the above study, embodiments of the present disclosure provide a force sensor and a method of manufacturing the same, a touch panel and a touch display panel, which may not only identify a touch position, but also determine a horizontal force or a force tending to incur a horizontal movement applied at the touch position. It is noted that phrases such as "horizontal force", "force tending to incur a horizontal movement" or the like used herein refer to a force or a force component parallel to or substantially parallel to a surface (e.g., a major surface) of the touch panel or the touch display panel, for example, a force or a force component parallel to or substantially parallel to a touch surface of the touch panel or the touch display panel (for the force sensor, the force or force component is parallel to or substantially parallel to a surface of a substrate of the force sensor, or perpendicular to a direction in which two substrates of the force sensor are arranged opposite to each other (as described below)); in a state where the force sensor, or the touch panel or the touch display panel provided with the force sensor is placed horizontally, this force or force component is generally parallel to or substantially parallel to a horizontal direction or is directed to the horizontal direction.

Figure 1:
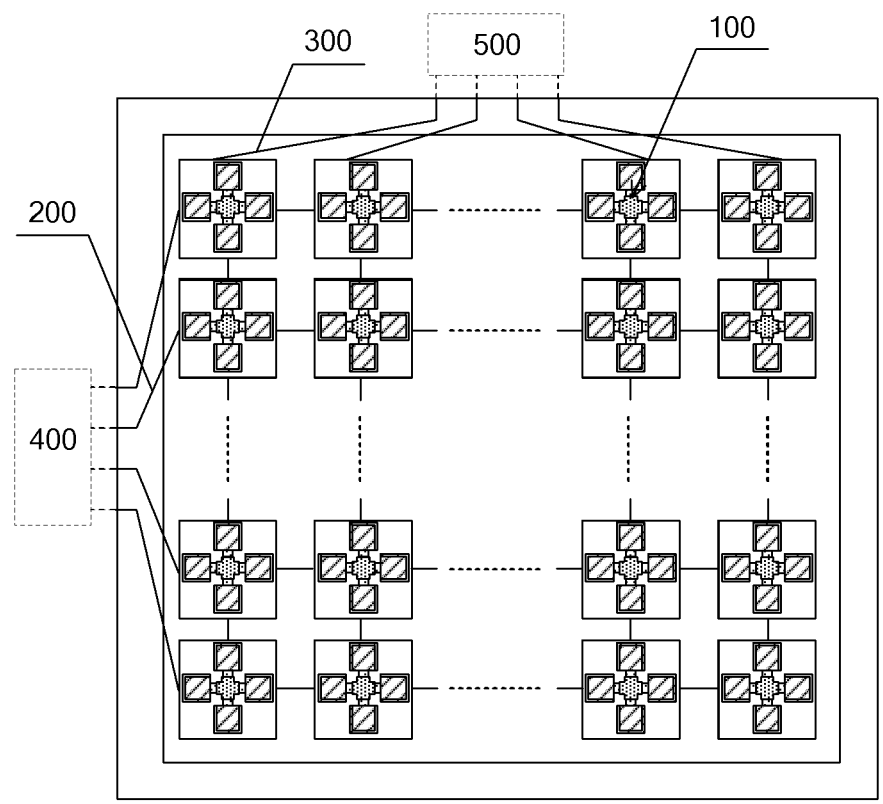
FIG. 1 is a plan view showing a configuration of a touch panel according to an embodiment of the present disclosure.

FIG. 1 is a structural schematic diagram of a touch panel according to an embodiment of the present disclosure. As shown in FIG. 1, the touch panel comprises a plurality of force sensors 100 arranged regularly to form an array having M rows and N columns, where M and N are each a positive integer larger than one. Each force sensor 100 is electrically connected with a scanning circuit 400 by a scanning signal line 200, and is electrically connected with a sensing circuit 500 by a sensing signal line 300. In operation, the scanning circuit input a scanning signal to each of the force sensors 100 in a row sequentially through the scanning signal line 200 at a certain frame frequency, for example, in a progressive scanning mode or non-interlaced scanning mode, and the sensing circuit acquires a sensing signal (e.g., a sensing voltage) from each of the force sensors 100 in the row through the sensing signal line 300, so as to determine, according the acquired sensing signal(s), a touch position where a touch object such as a finger or a stylus pen touches the touch panel and at least one of a direction and a magnitude of a force applied at the touch position by the touch object and tending to incur a horizontal movement.

In exemplary embodiments of the present disclosure, a force sensor comprises a first substrate and a second substrate arranged opposite to each other, the first substrate is configured to sense a force applied by a touch object and tending to incur a horizontal movement, and in case of being subject to the force tending to incur a horizontal movement, the first substrate is driven by the force to move relative to the second substrate, thereby it can determine, according to the movement, a touch position of the touch object and a direction and/or a magnitude of the force applied at the touch position and tending to incur a horizontal movement.

Technique schemes of the present disclosure will be described in detail below by describing exemplary embodiments of the present disclosure.

Figure 2:
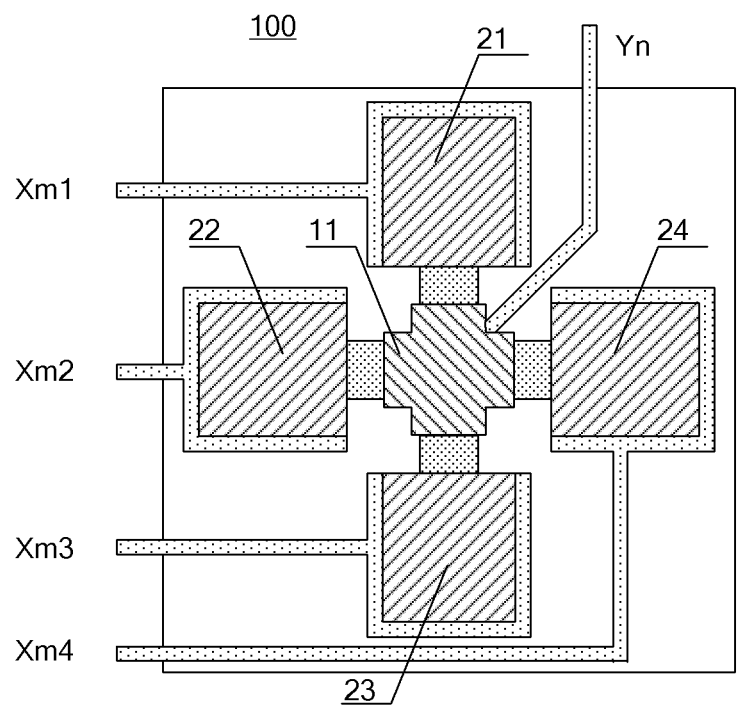
FIG. 2 is a plan view showing a configuration of a force sensor according to an embodiment of the present disclosure.
Figure 3:
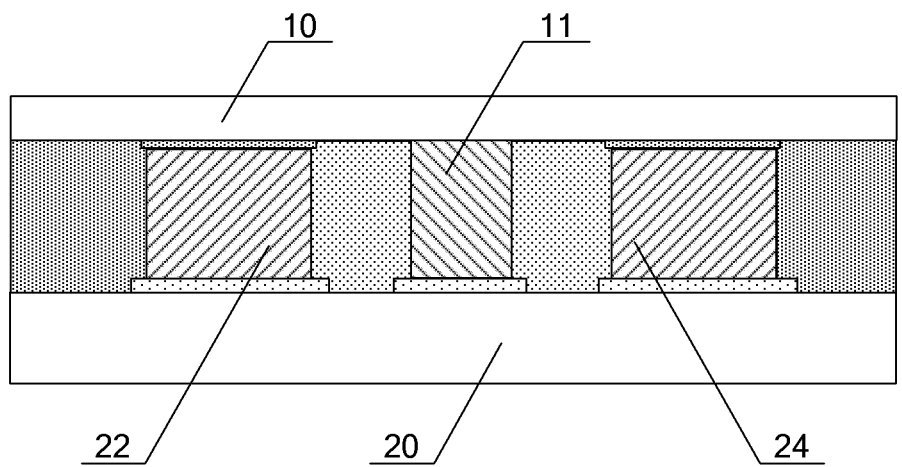
FIG. 3 is a cross sectional view of the configuration shown in FIG. 2.

FIG. 2 is a schematic diagram showing a structure of a force sensor according to an embodiment of the present disclosure, and FIG. 3 is a cross sectional view of the structure shown in FIG. 2. As shown in FIG. 2 and FIG. 3, the force sensor 100 in this embodiment comprises a triggering substrate 10 and a transmission substrate 20 arranged opposite to each other, the triggering substrate 10 is used, as the first substrate, for receiving a touch action from a touch object such as a finger or a stylus pen, and is driven by a force applied by the touch object and tending to incur a horizontal movement, to move relative to the transmission substrate 20, thereby achieving driving triggering. The transmission substrate 20 is used, as the second substrate, for achieving transmission of a scanning signal and a sensing signal. In this embodiment, each force sensor further comprises a sensing electrode 11 and a plurality of (for example, two or more) directional electrodes 21~24 disposed between the triggering substrate 10 and the transmission substrate 20. For example, the sensing electrode is arranged on a surface of one of the triggering substrate 10 and the transmission substrate 20 facing the other, while the directional electrodes are arranged on a surface of the other of the triggering substrate 10 and the transmission substrate 20 facing the one substrate, but the present disclosure is not limited to this. Based on requirement for sensing the touch action of the touch object and/or requirements for design, process and the like, the number of the sensing electrodes may be one or more, and the number and arrangement of the directional electrodes may match with the number and arrangement of the sensing electrodes, so that the touch position of the touch object and a direction and/or a magnitude of the force applied at the touch position and tending to incur a horizontal movement may be determined according to relative positions and/or induction interaction between the sensing electrode and the directional electrode. In the illustrated embodiment, each force sensor comprises one sensing electrode 11 and four directional electrodes 21~24, the sensing electrode 11 is provided on a surface of the triggering substrate 10 facing towards the transmission substrate 20, the directional electrodes 21~24 are provided on a surface of the transmission substrate 20 facing towards the triggering substrate 10 and include a first directional electrode 21, a second directional electrode 22, a third directional electrode 23 and a fourth directional electrode 24, and the four directional electrodes 21~24 are arranged symmetrically about the sensing electrode 11 as a center. In the illustrated embodiment, the sensing electrode and the directional electrodes each have a columnar structure, the present disclosure, however, is not limited to this; for example, in other embodiments, the sensing electrode and/or the directional electrode may be a plate electrode, a strip electrode, a mesh electrode or the like. As an example, in the plan view of FIG. 2, the first directional electrode 21 and the third directional electrode 23 are located at upper and lower sides of the sensing electrode 11 respectively, and the second directional electrode 22 and the fourth directional electrode 24 are located at left and right sides of the sensing electrode 11 respectively, thereby forming a cruciform symmetrical arrangement with the sensing electrode 11 as a center. Meanwhile, the first directional electrode 21 is electrically connected with the scanning circuit (see FIG. 1) by a first scan leading-out line Xm1, the second directional electrode 22 is electrically connected with the scanning circuit by a second scan leading-out line Xm2, the third directional electrode 23 is electrically connected with the scanning circuit by a third scan leading-out line Xm3, the fourth directional electrode 24 is electrically connected with the scanning circuit by a fourth scan leading-out line Xm4, and the sensing electrode 11 is electrically connected with the sensing circuit (see FIG. 1) by a sense leading-out line Yn.

Figures 4A, 4B:
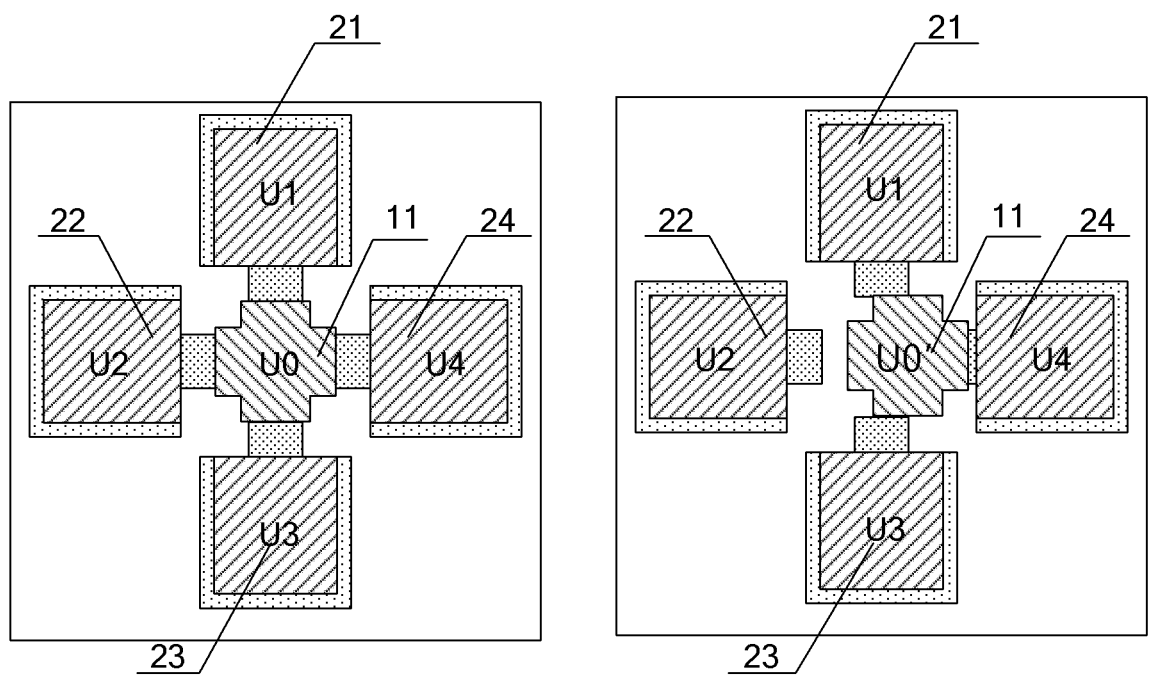
FIG. 4a and FIG. 4b are schematic diagrams showing an operation principle of a force sensor according to an embodiment of the present disclosure.

FIG. 4a and FIG. 4b schematically show the operation principle of a force sensor according to an embodiment of the present disclosure. With the force sensor according to embodiments of the present disclosure, the directional electrode is applied with a constant voltage and a sensing signal (for example, a voltage or a current) of the sensing electrode is acquired for determining a touch position and a movement direction of the sensing electrode at the touch position, thereby determining a direction and/or a magnitude of a force applied at the touch position and tending to incur a horizontal movement. In operation, the scanning circuit applies a first voltage signal U1 to the first directional electrode 21 through the first scan leading-out line Xm1, a second voltage signal U2 to the second directional electrode 22 through the second scan leading-out line Xm2, a third voltage signal U3 to the third directional electrode 23 through the third scan leading-out line Xm3, and a fourth voltage signal U4 to the fourth directional electrode 24 through the fourth scan leading-out line Xm4. In an example, values of the first voltage signal U1, the second voltage signal U2, the third voltage signal U3 and the fourth voltage signal U4 are different from one another. Under induction of the voltage signal of the directional electrode, the sensing electrode 11 will generate a corresponding sensing signal, and the sensing circuit acquires the sensing signal of the sensing electrode 11 through the sense leading-out line Yn.

When no touch is made, sensing signals of respective force sensors acquired by the sensing circuit are the same; when a touch occurs, the sensing signal of the force sensor at the touch position will be changed, thus the sensing circuit may discriminate the force sensor with a changed sensing signal, and determine, based on a scanning mode of the scanning circuit, for example, a progressive scanning mode of the scanning circuit at a certain frame frequency, the touch position according to coordinates of the force sensor with the changed sensing signal.

When the touch object applies a pressure to the touch panel in a direction perpendicular to a major surface of the touch panel (first time), the sensing electrode 11 at the touch position is located at a center of an arrangement of four directional electrodes, and generates a sensing voltage U0, and after the sensing circuit acquires the sensing voltage U0 from the sensing electrode 11, characteristic voltages $\Delta U1$, $\Delta U2$, $\Delta U3$ and $\Delta U4$ of the sensing electrode 11 may be obtained at the time, where $\Delta U1=U1-U0$, $\Delta U2=U2-U0$, $\Delta U3=U3-U0$, $\Delta U4=U4-U0$, as shown in FIG. 4a.

When the touch object applies a force, which is parallel to a surface of the touch panel and tends to incur a horizontal movement, to the touch panel (second time), the triggering substrate is driven, under a static friction, by the force tending to incur a horizontal movement at the touch position, so as to move in the same direction as the direction of the force, thereby driving the sensing electrode 11 on the triggering substrate to move. For example, as shown in FIG. 4b, the sensing electrode 11 moves away from the center position in a direction towards the fourth directional electrode 24. Due to movement of the sensing electrode 11, distances between the sensing electrode 11 and the directional electrodes are changed, so the sensing voltage of the sensing electrode is changed from U0 to U0'. After the sensing circuit acquires the sensing voltage U0', characteristic voltages $\Delta U1'$, $\Delta U2'$, $\Delta U3'$ and $\Delta U4'$, which represent four direction characteristics at the second time respectively, of the sensing electrode 11 may be obtained, where $\Delta U1'=U1-U0'$, $\Delta U2'=U2-U0'$, $\Delta U3'=U3-U0'$, $\Delta U4'=U4-U0'$.

The sensing circuit can determine the movement direction of the sensing electrode 11 by comprising characteristic voltages $\Delta U$ and $\Delta U'$ at the first time and the second time. Specifically, based on voltage induction principle, when a distance of the sensing electrode 11 from the fourth directional electrode 24 is reduced, the sensing voltage of the sensing electrode 11 tends to approximate to the voltage U4 of the fourth directional electrode 24, and in this case, the characteristic voltage $\Delta U4'$ in the fourth direction will be reduced. Similarly, when distances of the sensing electrode 11 from other three directional electrodes are increased, the characteristic voltages in these three directions are increased. Thus, the sensing circuit can determine that the characteristic voltage $\Delta U4'$ is reduced by comparing $\Delta U1'$ with $\Delta U1$, comparing $\Delta U2'$ with $\Delta U2$, comparing $\Delta U3'$ with $\Delta U3$ and comparing $\Delta U4'$ with $\Delta U4$, and thus determine the movement direction of the sensing electrode 11 is a direction towards the fourth directional electrode 24, thereby determining the direction of the force applied to the sensing electrode 11 and tending to incur a horizontal movement is a direction towards the fourth directional electrode 24. Further, based on a magnitude of a difference between $\Delta U4'$ and $\Delta U4$, it can also determine a magnitude of the force applied to the sensing electrode 11 and tending to incur a horizontal movement.

As can be seen from the above operation principle, the force sensor provided in embodiments of the present disclosure embodiment can not only sense a force tending to incur a horizontal movement in a single direction, but also sense a force tending to incur a horizontal movement in a rotation direction. Specifically, when the touch object applies a force tending to incur a horizontal movement in a certain direction while being stationary in position, the movement direction of the sensing electrode determined by the sensing circuit is constant for different frames. When the touch object applies a force tending to incur a horizontal movement in a rotation direction while being stationary in position, the movement direction of the sensing electrode determined by the sensing circuit varies for different frames. For example, if the sensing circuit determines that $\Delta U4'$ is reduced during respective frames of a first time period, $\Delta U3'$ is reduced during respective frames of a second time period, $\Delta U2'$ is reduced during respective frames of a third time period, and $\Delta U1'$ is reduced during respective frames of a fourth time period, then the sensing circuit may determine that the sensing electrode moves towards the fourth directional electrode during the first time period, moves towards the third directional electrode during the second time period, moves towards the second directional electrode during the third time period, and moves towards the first directional electrode during the fourth time period, and thereby can determine the direction of the force applied to the sensing electrode and tending to incur a horizontal movement is a rotation direction; for the arrangement of the directional electrodes shown in FIGS. 4a and 4b, it can be determined that the touch object is moved (for example, rubs) in a clockwise direction at the touch position. Obviously, various touch states of the user may be achieved without changing the touch position, thereby diversity in the human-computer interaction may be greatly enriched and the touch control technology may be extended to a multi-dimension domain.

Figure 5A:
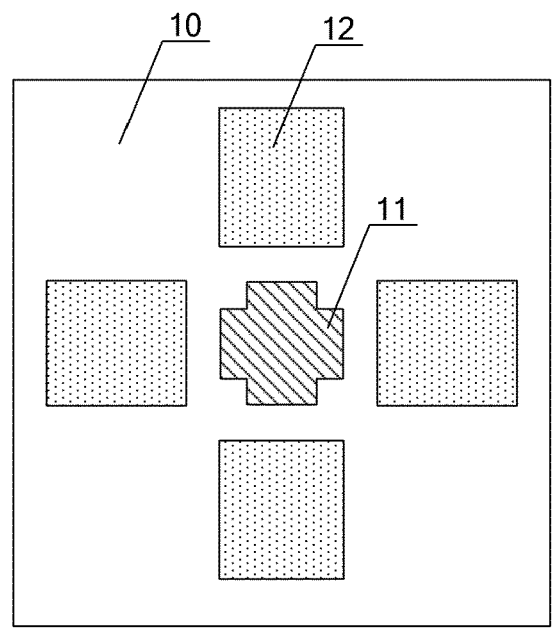
FIG. 5a is a plan view showing a triggering substrate and an arrangement of electrodes on the triggering substrate in a force sensor according to an embodiment of the present disclosure.
Figure 5B:
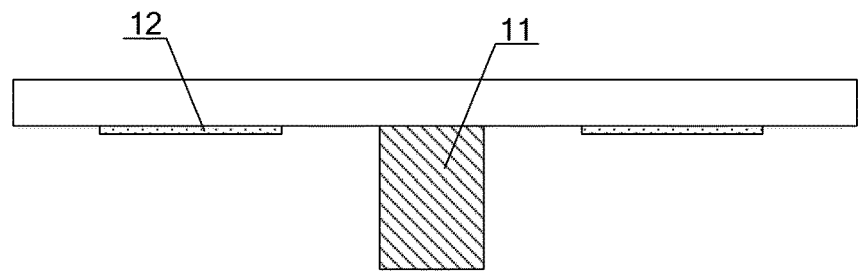

FIG. 5a is a plan view showing a triggering substrate and an arrangement of electrodes on the triggering substrate in a force sensor according to an embodiment of the present disclosure, and FIG. 5b is a cross sectional view of the arrangement shown in FIG. 5a. As shown in FIG. 5a and FIG. 5b, the triggering substrate in this embodiment is used as the first substrate, on which a columnar sensing electrode 11 and a film-shaped lubrication layer 12 are provided. The triggering substrate is used to receive a touch from a touch object, and is driven to move under a force applied by the touch object and tending to incur a horizontal movement so as to bring the sensing electrode 11 to move, thereby changing a distance between the sensing electrode 11 and the directional electrode provided on the transmission substrate. After the triggering substrate and the transmission substrate are aligned and engaged with each other, the sensing electrode 11 is located among the directional electrodes and configured to generate a sensing voltage, the lubrication layer 12 is in contact with a top end or a top face (that is, an end or an end face facing the triggering substrate) of the directional electrodes on the transmission substrate so as to reduce a friction for relative movement between the triggering substrate and the transmission substrate.

Figure 6A:
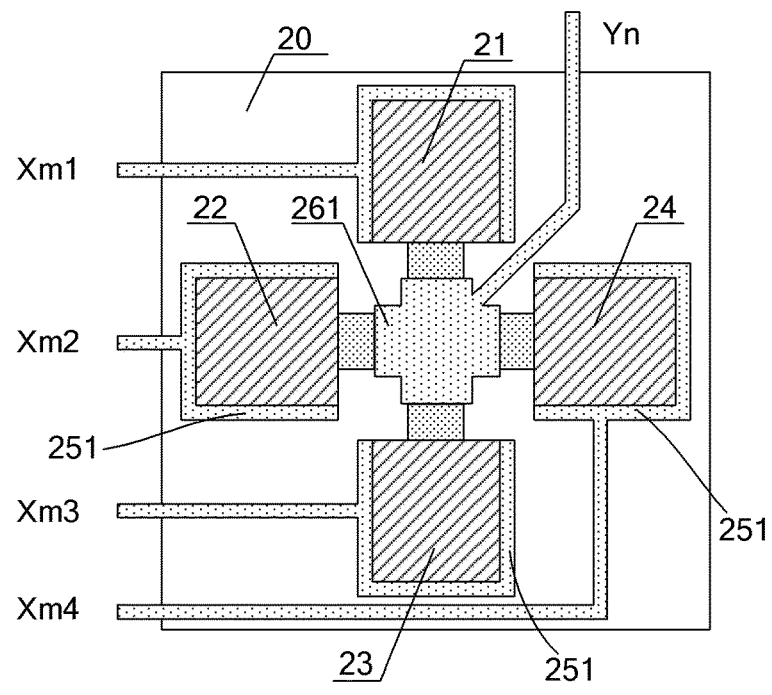
FIG. 6a is a plan view showing a transmission substrate and an arrangement of electrodes on the transmission substrate in a force sensor according to an embodiment of the present disclosure.
Figure 6B:
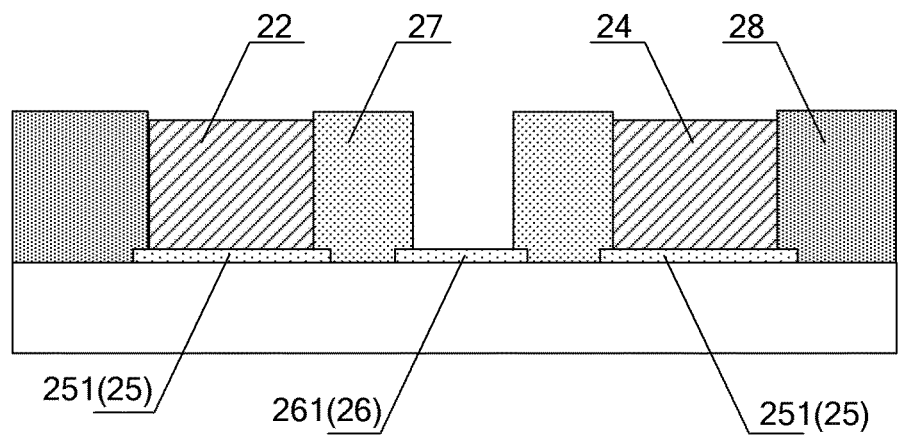

FIG. 6a is a plan view showing a transmission substrate and structures on the transmission substrate in a force sensor according to an embodiment of the present disclosure, and FIG. 6b is a cross sectional view of the structure shown in FIG. 6a. As shown in FIG. 6a and FIG. 6b, the transmission substrate in this embodiment is used as the second substrate, on which a scanning signal transmission layer 25, a sensing signal transmission layer 26, a dielectric layer 27 and an insulation layer 28 are provided, and four columnar directional electrodes including a first directional electrode 21, a second directional electrode 22, a third directional electrode 23 and a fourth directional electrode 24 are disposed on the scanning signal transmission layer 25. In an example, a film-shaped scanning signal transmission layer 25 is provided on the transmission substrate and comprises four scan connection electrodes 251 and four scan leading-out lines (including a first scan leading-out line Xm1, a second scan leading-out line Xm2, a third scan leading-out line Xm3 and a fourth scan leading-out line Xm4), each scan connection electrode being connected with one scan leading-out line. Four columnar directional electrodes (including a first directional electrode 21, a second directional electrode 22, a third directional electrode 23 and a fourth directional electrode 24) are disposed on or connected with the four scan connection electrodes respectively, such that each directional electrode is electrically connected with the scanning circuit through one scan connection electrode and one scan leading-out line, so as to receive a voltage signal from the scanning circuit. A film-shaped sensing signal transmission layer 26 is provided on the transmission substrate, and comprises a sensing connection electrode 261 and a sense leading-out line Yn connected with each other, the sensing connection electrode is located at a center of an arrangement of the four directional electrodes, and electrically contacts with or is electrically connected with a bottom end or a bottom face of the columnar sensing electrode 11 (that is, an end or an end face of the sensing electrode 11 facing the transmission substrate) on the triggering substrate after the triggering substrate and the transmission substrate are aligned and engaged with each other, such that the sensing voltage generated by the sensing electrode 11 is transmitted to the sensing circuit through the sensing connection electrode and the sense leading-out line. As shown in the figures, the dielectric layer 27 is provided on the transmission substrate and comprises four columnar dielectric blocks each arranged between the sensing connection electrode and one of the four directional electrodes, and after the triggering substrate and the transmission substrate are aligned and engaged with each other, the four dielectric blocks are located between the sensing electrode 11 and the four directional electrodes respectively. The dielectric layer 27 is configured for isolating the sensing electrode from the directional electrodes, and for providing a restoring force for restoring the sensing electrode 11 to its original position. The dielectric layer is arranged between the sensing electrode and the directional electrodes, thus the dielectric block(s) at corresponding position(s) will be compressed when the sensing electrode is moved. When the force tending to incur a horizontal movement and driving the sensing electrode to move disappears, the compressed dielectric block will restore its original shape under its elasticity, so that the elastic restoring force restores the sensing electrode to its original position, thus the sensing electrode returns to the center position. For purpose of clarity, the insulation layer 28 is omitted from the plan view. The insulation layer 28 is provided on the transmission substrate and around the four directional electrodes, for insulating the force sensors from each other.

Technique schemes of the present disclosure will be further described by describing a method of manufacturing a force sensor according to an exemplary embodiment. "Patterning process" described in embodiments of the present disclosure includes depositing a film layer, coating photoresist, exposure through a mask, development, etching, peeling off photoresist and the like, and is an existing riped manufacturing process. The depositing may be achieved by using a known process such as sputtering, evaporation, chemical vapor deposition or the like, the coating may be achieved by using a known coating process, the etching may be achieved by a known way, which will not be particularly limited herein.

The method of manufacturing a force sensor according to an embodiment of the present disclosure mainly comprises: (1) providing a triggering substrate and a transmission substrate, and forming a sensing electrode and a directional electrode on the triggering substrate and the transmission substrate respectively; (2) aligning and engaging the triggering substrate and the transmission substrate on which corresponding electrodes are formed. In an embodiment, the method of manufacturing a force sensor comprises providing a triggering substrate, and forming a sensing electrode on the triggering substrate. In an example, forming the sensing electrode comprises depositing a first conductive layer, for example, a metal layer, on the triggering substrate, and coating a layer of photoresist on the first conductive layer, implementing exposure and development of the photoresist through a monotone mask so as to form a non-exposed region where the photoresist is remained at a position where a pattern of the sensing electrode is to be formed and form a fully exposed region where the photoresist is removed at other positions, etching and removing a portion of the first conductive layer in the fully exposed region, and peeling off residual photoresist, thereby forming a pattern of a columnar sensing electrode, as shown in FIG. 5a and FIG. 5b. In some examples, the method further comprises forming a lubrication layer on the triggering substrate. Exemplarily, forming the lubrication layer may comprise coating a layer of lubrication film on the triggering substrate, and implementing exposure and development of the lubrication film through a monotone mask so as to form a pattern of the lubrication layer. In this embodiment, a sequence forming the lubrication layer and the sensing electrode may vary, for example, the sensing electrode is firstly formed and then the lubrication layer is formed, and vice versa, which will not be particularly limited herein. In an example, the lubrication layer having a thickness of 50~150 μm, and the sensing electrode has a thickness of 550~850 μm.

The method of manufacturing a force sensor further comprises provides a transmission substrate, and forming directional electrodes on the transmission substrate. In some embodiments, in additional to the directional electrodes, a scanning signal transmission layer, a sensing signal transmission layer, a dielectric layer and an insulation layer may be formed on the transmission substrate. In embodiments shown in FIG. 7a to FIG. 10, a process is described in which patterns of the scanning signal transmission layer and the sensing signal transmission layer are firstly formed, then a pattern of the directional electrodes is formed, and finally patterns of the dielectric layer and the insulation layer are formed.

Figure 7A:
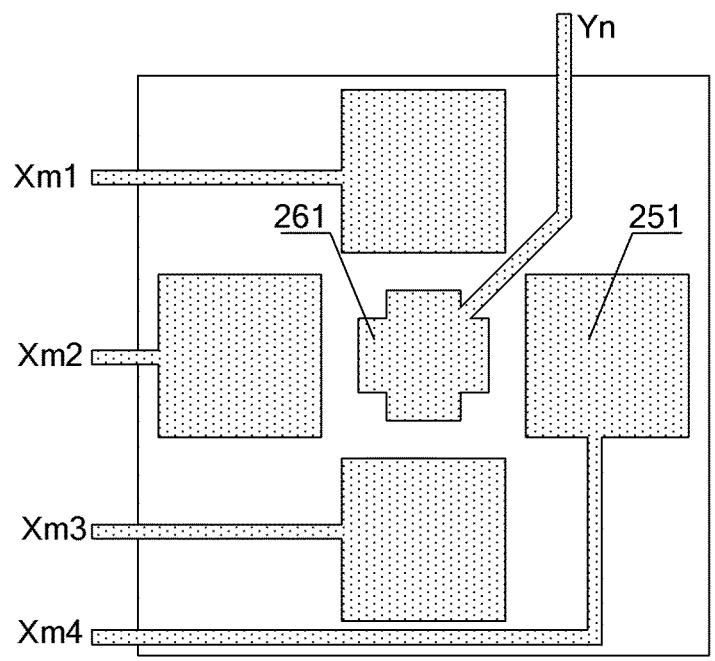
FIG. 7a is a schematic diagram showing patterns of a scanning signal transmission layer and a sensing signal transmission layer formed in a method of manufacturing a force sensor according to an embodiment of the present disclosure.
Figure 7B:
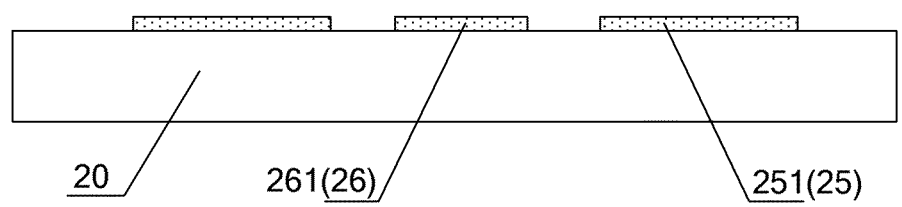

The method comprises forming patterns of a scanning signal transmission layer and a sensing signal transmission layer on the transmission substrate. In an example, forming the patterns of the scanning signal transmission layer and the sensing signal transmission layer comprises: depositing a second conductive layer, such as a transparent conductive layer on the transmission substrate 20, coating a layer of photoresist on the second conductive layer, implementing exposure and development of the photoresist through a monotone mask so as to form a non-exposed region where the photoresist is remained at a position where patterns of a scanning signal transmission layer and a sensing signal transmission layer are to be formed and form a fully exposed region where the photoresist is removed at other positions, etching and removing a portion of the second conductive layer in the fully exposed region, and peeling off residual photoresist, thereby forming patterns of the scanning signal transmission layer 25 and the sensing signal transmission layer 26, as shown in FIG. 7a and FIG. 7b. In an example, the pattern of the scanning signal transmission layer 25 comprises a pattern of four scan connection electrodes 251 and a pattern of four scan leading-out lines Xm1~Xm4, and each scan connection electrode is connected with one scan leading-out line; the pattern of the sensing signal transmission layer 26 comprises a pattern of a sensing connection electrode 261 and a pattern of a sense leading-out line Yn, and the sensing connection electrode is located at a center of the pattern of the four scan connection electrodes. In an example, the scanning signal transmission layer 25 and the sensing signal transmission layer 26 each have a thickness of 50~150 μm.

Figure 8A:
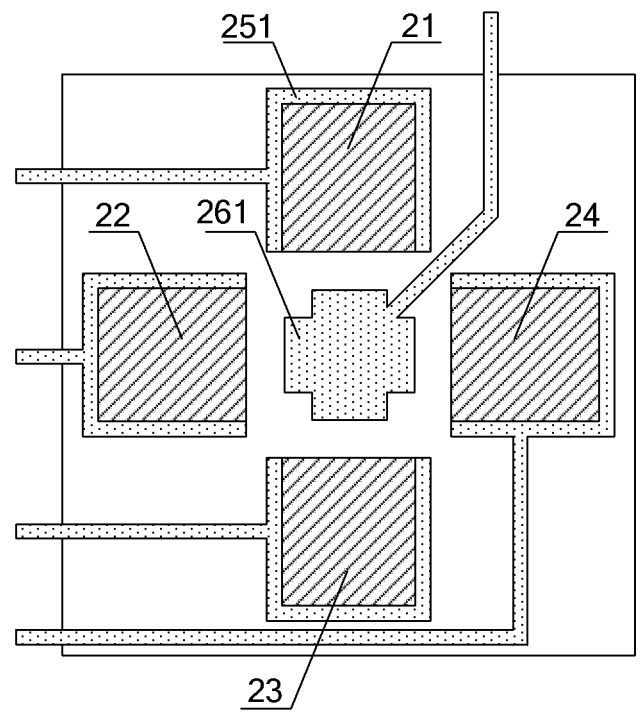
FIG. 8a is a schematic diagram showing a pattern of directional electrodes formed in a method of manufacturing a force sensor according to an embodiment of the present disclosure.
Figure 8B:
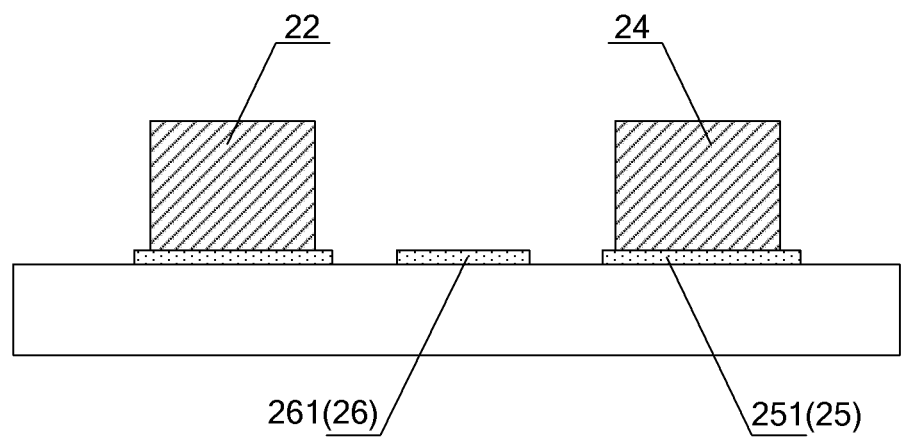

The method further comprises forming a pattern of directional electrodes. In an example, forming the pattern of directional electrodes comprises: depositing a third conductive layer, such as a metal layer, on the transmission substrate on which the patterns of the scanning signal transmission layer and the sensing signal transmission layer are formed, coating a layer of photoresist on the third conductive layer, implementing exposure and development of the photoresist through a monotone mask so as to form a non-exposed region where the photoresist is remained at a position where a pattern of directional electrodes is to be formed and a fully exposed region where the photoresist is removed at other positions, etching and removing a portion of the third conductive layer in the fully exposed region, and peeling off residual photoresist, thereby forming a pattern of columnar directional electrodes 22~24, as shown in FIG. 8*a* and FIG. 8*b*. Exemplarily, the four directional electrodes (including a first directional electrode 21, a second directional electrode 22, a third directional electrode 23 and a fourth directional electrode 24) are disposed on the four scan connection electrodes 251 respectively and each have a thickness of 500~800 μm.

Figure 9A:
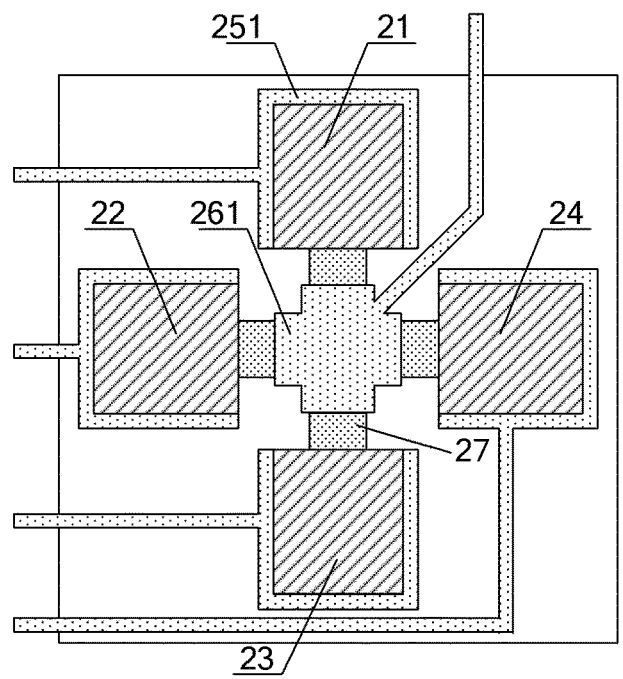
FIG. 9a is a schematic diagram showing a pattern of a dielectric layer formed in a method of manufacturing a force sensor according to an embodiment of the present disclosure.
Figure 9B:
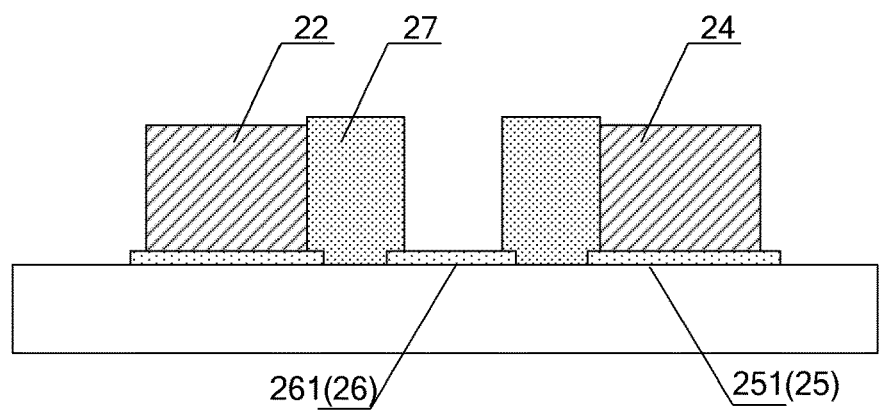

The method further comprises forming a pattern of a dielectric layer. In an example, forming the pattern of the dielectric layer comprises: coating a layer of a dielectric film on the transmission substrate on which the above patterns are formed, implementing exposure and development of the dielectric film through a monotone mask so as to form a pattern of a dielectric layer 27, as shown in FIG. 9*a* and FIG. 9*b*. In some examples, the pattern of the dielectric layer 27 comprises four dielectric blocks each disposed between the sensing connection electrode and one directional electrode, and the dielectric layer 27 having a thickness of 600~900 μm; the thickness of the dielectric layer may be larger than the thickness of the directional electrode, or a distance of an upper surface (a surface facing away from the transmission substrate) of the dielectric layer 27 from an upper surface (a surface facing the dielectric layer or facing the directional electrode) of the transmission substrate is larger than a distance of an upper surface (a surface facing away from the transmission substrate) of the directional electrode from the upper surface of the transmission substrate, so that after the triggering substrate and the transmission substrate are aligned and engaged with each other, the four dielectric blocks isolate the sensing electrode from the directional electrodes.

Figure 10:
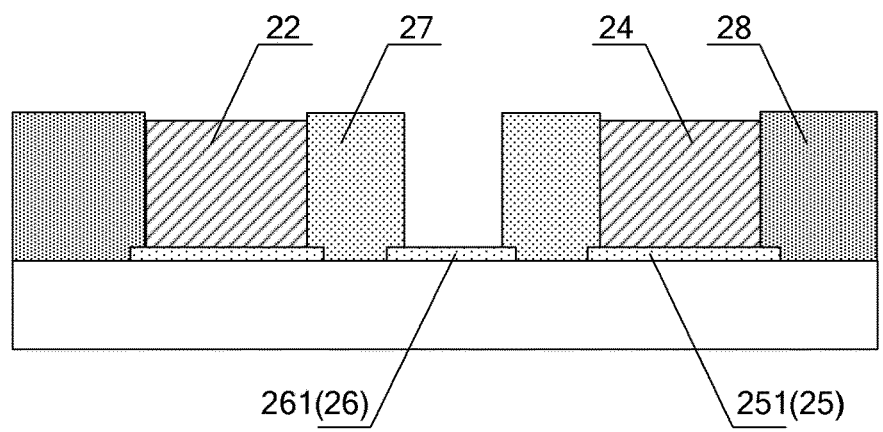
FIG. 10 is a schematic diagram showing a pattern of an insulation layer formed in a method of manufacturing a force sensor according to an embodiment of the present disclosure.

The method further comprises forming a pattern of an insulation layer. In an example, forming the pattern of the insulation layer comprises: coating a layer of an insulation film on the transmission substrate on which the above patterns are formed, implementing exposure and development of the insulation film through a monotone mask so as to form a pattern of an insulation layer 28, as shown in FIG. 10. In some examples, the pattern of the insulation layer 28 is located around or at outer sides of the four directional electrodes and has a thickness of 600~900 μm; the thickness of the insulation layer may be larger than the thickness of the directional electrode, or a distance of an upper surface (a surface facing away from the transmission substrate) of the insulation layer 28 from an upper surface (a surface facing the insulation layer or facing the directional electrode) of the transmission substrate is larger than a distance of an upper surface (a surface facing away from the transmission substrate) of the directional electrode from the upper surface of the transmission substrate, so that after the triggering substrate and the transmission substrate are aligned and engaged with each other, the insulation layer forms an insulation barrier between the force sensors.

In some examples, the transmission substrate may be a glass substrate or a quartz substrate, the triggering substrate may be a flexible substrate made of a plastic or polymer material, the scanning signal transmission layer may be made of indium tin oxide (ITO) or indium zinc oxide IZO, the sensing signal transmission layer may be made of a wear resistant conductive material or may also be made of ITO or IZO, the directional electrode and the sensing electrode may be made of one or more of platinum (Pt), ruthenium (Ru), gold (Au), silver (Ag), molybdenum (Mo), chromium (Cr), aluminum (Al), tantalum (Ta), titanium (Ti), tungsten (W) and the other metals, the lubrication layer may be made of polytetrafluoroethylene (PTFE), the dielectric layer may be made of a material having an elasticity, and the insulation layer may be made of a resin material; the present disclosure, however, will not be limited to those materials.

In other examples, the patterns of the scanning signal transmission layer and the sensing signal transmission layer may also be formed by using two processes respectively, and the material for manufacturing the scanning signal transmission layer is different from the material for manufacturing the sensing signal transmission layer. For example, the scanning signal transmission layer is made of indium tin oxide (ITO) or indium zinc oxide (IZO), while the sensing signal transmission layer is made of a wear resistant conductive material.

Figure 11:
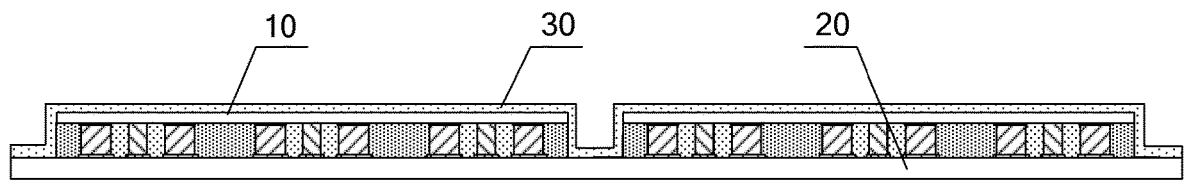
FIG. 11 is a schematic diagram showing packaging of a triggering substrate and a transmission substrate in a method of manufacturing a force sensor according to an embodiment of the present disclosure.

After forming the above patterns on the triggering substrate and the transmission substrate, the two substrates are aligned and engaged with each other. In an embodiment, if the triggering substrate is made of a harder material, a combined triggering substrate may be adopted, that is, the triggering substrate comprises or is divided into a plurality of triggering substrate units, and a preset interval is provided between the triggering substrate units, so that when a certain triggering substrate unit is moved under driving of a force applied by the touch object and tending to incur a horizontal movement, other triggering substrate units will not be interfered. When being implemented in practice, sizes of the triggering substrate units may be designed according to a size of an existing touch electrode. For example, the triggering substrate unit may be designed in a rectangular shape having sizes of 4*4 mm or 5*5 mm, and each triggering substrate unit includes a plurality of force sensors arranged regularly. During the aligning and engaging, the plurality of triggering substrate units are aligned and engaged with the transmission substrate sequentially, and then the triggering substrate and the transmission substrate are packaged into a single piece by a packaging layer 30, as shown in FIG. 11. In an example, a bonding encapsulation process using a wear-resistant plastic film may be adopted where the packaging layer 30 covers the plurality of triggering substrate units, and the plurality of triggering substrate units are boned to the transmission substrate at positions in gaps between the triggering substrate units and in a region around the triggering substrate units, thereby forming an integrated touch panel where the triggering substrate and the transmission substrate are bonded to each other and will not separated from each other. In another embodiment, if the triggering substrate is made of a flexible material, a monolithic triggering substrate may be adopted, the flexibility may also ensure only the triggering substrate in a region where the touch position is located will be moved.

Figure 12:
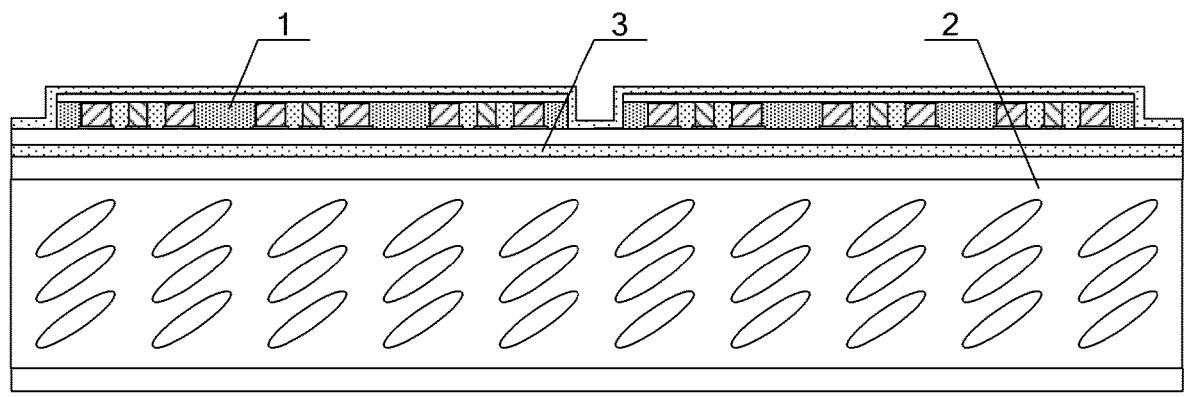
FIG. 12 is a cross sectional view showing a configuration of a touch display panel according to an embodiment of the present disclosure.

When being implemented in practice, the touch panel in this embodiment may be combined with a display panel so as to form a touch display panel. FIG. 12 is a structural schematic diagram of a touch display panel according to an embodiment of the present disclosure. The touch display panel comprises a touch panel 1 and a display panel 2, and the touch panel 1 is arranged on a light exit surface of the display panel 2 and is fixed by using an adhesive 3. The display panel may be a Liquid Crystal Display (LCD) panel or an Organic Light Emitting Diode (OLED) panel, or may also be other flat display.

In the force sensor provided in embodiments of the present disclosure, the first substrate and the second substrate are arranged opposite to each other, such that the first substrate is movable relative to the second substrate, when being subject to a force applied by a touch object making a touch action and tending to incur a horizontal movement, and it causes a relative movement, which corresponds to or matches with a magnitude and a direction of the force, between the sensing electrode and the directional electrode provided on the first substrate and the second substrate; with the relative movement, not only the touch position may be determined, but also the force applied at the touch position and tending to incur a horizontal movement may be sensed. By sensing the applied force tending to incur a horizontal movement, a touch intention of a user may be recognized, such that the user may make a touch operation reflecting such intention without moving the touch object, thereby diversity in the human-computer interaction may be greatly enriched and the touch control technology may be extended to a multi-dimension domain.

Figure 13:
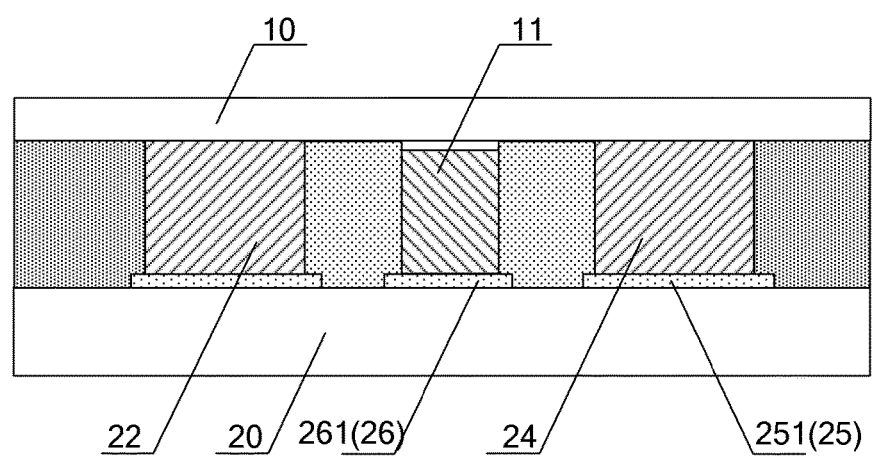
FIG. 13 is a cross sectional view showing a configuration of a force sensor according to another embodiment of the present disclosure.

Another embodiment of the present disclosure provides a force sensor, where directional electrodes are provided on a triggering substrate while a sensing electrode is provided on a transmission substrate. As shown in FIG. 13. The force sensor in this embodiment comprises a triggering substrate 10 as the first substrate, four columnar directional electrodes 21, 22, 23 and 24 provided on the triggering substrate, a transmission substrate 20 as the second substrate, a scanning signal transmission layer 25, and a sensing signal transmission layer 26 provided on the transmission substrate, and a columnar sensing electrode 11 provided on the sensing signal transmission layer 26. After the triggering substrate 10 and the transmission substrate 20 are aligned and engaged with each other, bottom ends (ends adjacent to the transmission substrate) of the four columnar directional electrodes on the triggering substrate 10 are in close contact with the scanning signal transmission layer on the transmission substrate 20, and the columnar directional electrodes receive voltage signals inputted by the scanning circuit through the scan leading-out lines; an end of the sensing electrode 11 adjacent to the triggering substrate 10 may be suspended, or may contact with the lubrication layer on the triggering substrate. The dielectric layer and the insulation layer may be provided on the triggering substrate, or may be provided on the transmission substrate. In this embodiment, the sensing electrode may be fixed or stationary, and the four directional electrodes may move together with the triggering substrate; in this case, the principle for determining the direction and the magnitude of the force tending to incur a horizontal movement is the same as that described in the above embodiments.

When being implemented in practice, configurations of embodiments of the present disclosure may be extended in similar ways. For example, the dielectric layer may be provided on the triggering substrate. As another example, the sensing signal transmission layer may be provided on the triggering substrate, and the sensing electrode is provided on the sensing connection electrode and is electrically with the sensing circuit by the sensing connection electrode and the sense leading-out line. In some other examples, the scanning signal transmission layer and the sensing signal transmission layer may be provided on the triggering substrate; and so on.

Figure 14:
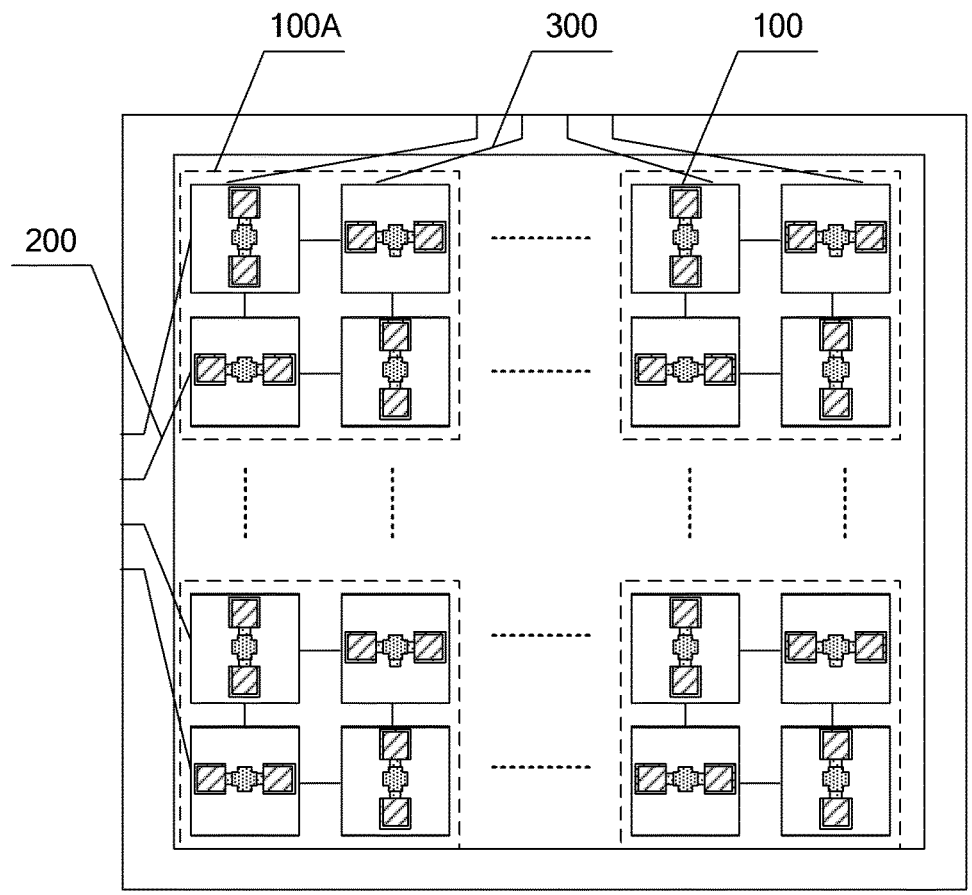
FIG. 14 is a plan view showing a configuration of a force sensor according to a further embodiment of the present disclosure.

Although the above embodiments have been described by taking one force sensor comprising four directional electrodes as an example, the number of the directional electrodes in one force sensor may be designed according to relevant requirements when being implemented in practice, for example, the number of the directional electrodes may be from two to eight. When a higher precision is required, the number of the directional electrodes may be increased, for example, may be six or eight; when a lower precision is required, the number of the directional electrodes may be reduced, for example, may be two or three. FIG. 14 is a schematic diagram showing a touch panel and an arrangement of force sensors on the touch panel according to a further embodiment of the present disclosure. As shown in FIG. 14, the touch panel in this embodiment comprises a plurality of triggering substrate units 100A arranged regularly, and each triggering substrate unit 100A has a rectangular shape having sizes of about 4*4 mm or 5*5 mm. In an example, each triggering substrate unit 100A comprises a plurality of (for example, four) force sensors 100 arranged regularly, each force sensor 100 comprises one sensing electrode and two directional electrodes arranged symmetrically about the one sensing electrode as a center, and directional electrodes of different force sensors 100 in a same one triggering substrate unit have different arrangement directions. For example, some directional electrodes are arranged in a left and right direction, some other directional electrodes are arranged in an up and down direction, so that their arrangement directions are perpendicular to each other. With this arrangement, the force sensor having two directional electrodes arranged in the left and right direction may sense a force tending to incur a horizontal movement in the left and right direction, the force sensor having two directional electrodes arranged in the up and down direction may sense a force tending to incur a horizontal movement in the up and down direction, thereby enabling one triggering substrate unit to sense forces tending to incur a horizontal movement in many directions. With the design of this embodiment, the number of the scan leading-out lines may be effectively reduced, and the configuration of the touch panel is simplified.

Figure 15:
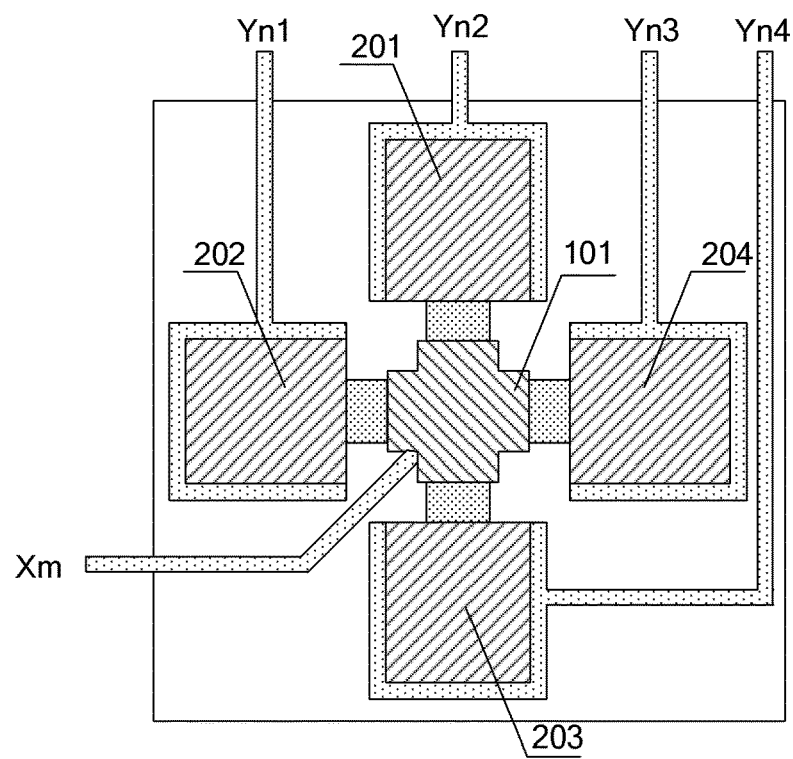
FIG. 15 is a plan view showing a configuration of a force sensor according to a yet another embodiment of the present disclosure.
Figure 16:
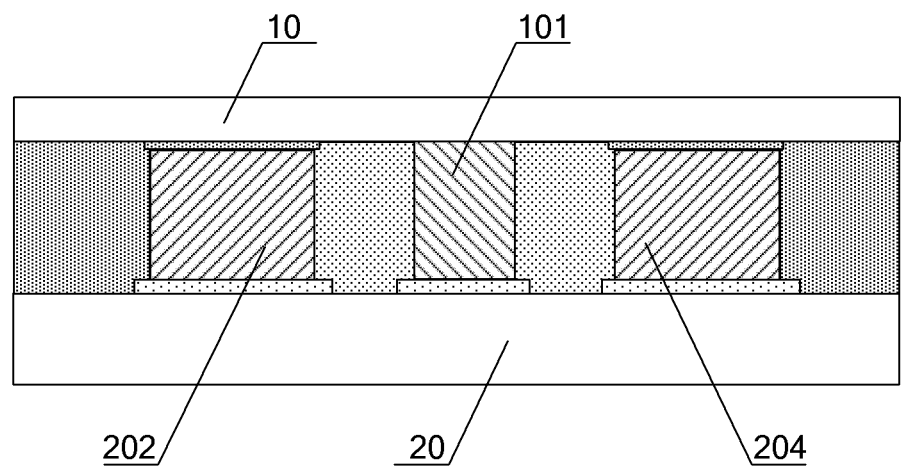
FIG. 16 is a cross sectional view of the configuration shown in FIG. 15.

FIG. 15 is a schematic diagram showing a structure of a force sensor according to another embodiment of the present disclosure, and FIG. 16 is a cross sectional view of the structure shown in FIG. 15. As shown in FIG. 15 and FIG. 16, the force sensor in this embodiment comprises a triggering substrate 10 and a transmission substrate 20 arranged opposite to each other, the triggering substrate 10 is used, as the first substrate, for receiving a touch action from a touch object such as a finger or a stylus pen, and is driven by a force applied by the touch object and tending to incur a horizontal movement, so as to move relative to the transmission substrate 20, thereby achieving driving triggering.

The transmission substrate 20 is used, as the second substrate, for achieving transmission of a scanning signal and a sensing signal.

In this embodiment, the force sensor further comprises one columnar directional electrode 101 provided on the triggering substrate 10 and a plurality of (for example, two or more) sensing electrodes provided on the transmission substrate 20. In the illustrated embodiment, four columnar sensing electrodes are provided on the transmission substrate 20 and include a first sensing electrode 201, a second sensing electrode 202, a third sensing electrode 203 and a fourth sensing electrode 204, and the four sensing electrodes on the transmission substrate 20 are arranged symmetrically about the directional electrode 101 as a center. For example, in the plan view of FIG. 15, the first sensing electrode 201 and the third sensing electrode 203 are located at upper and lower sides of the directional electrode 101 respectively, and the second sensing electrode 202 and the fourth sensing electrode 204 are located at left and right sides of the directional electrode 101 respectively, thereby forming a cruciform symmetrical arrangement with the directional electrode 101 as a center. Meanwhile, the directional electrode 101 is electrically connected with the scanning circuit 400 (see FIG. 1) by the scan leading-out line Xm, the first sensing electrode 201 is electrically connected with the sensing circuit 500 (see FIG. 1) by a first sense leading-out line Yn1, the second sensing electrode 202 is electrically connected with the sensing circuit by a second sense leading-out line Yn2, the third sensing electrode 203 is electrically connected with the sensing circuit by a third sense leading-out line Yn3, the fourth sensing electrode 204 is electrically connected with the sensing circuit by a fourth sense leading-out line Yn4.

The operation principle of the force sensor in this embodiment is described as follows: the one directional electrode is applied with a constant voltage and sensing signals (for example, voltage or current) of the four sensing electrodes are acquired for determining a touch position and a movement direction of the directional electrode at the touch position, thereby determining a direction and/or a magnitude of a force applied at the touch position and tending to incur a horizontal movement. In operation, the scanning circuit applies a voltage signal to the directional electrode 101 through the scan leading-out line Xm, and under induction of the voltage signal of the directional electrode, the four sensing electrodes will generate corresponding sensing signals, and the sensing circuit acquires the sensing signal from the first sensing electrode 201 through the first sense leading-out line Yn1, the sensing signal from the second sensing electrode 202 through the second sense leading-out line Yn2, the sensing signal from the third sensing electrode 203 through the third sense leading-out line Yn3, and the sensing signal from the fourth sensing electrode 204 through the fourth sense leading-out line Yn4.

When no touch is made, sensing signals of respective force sensors acquired by the sensing circuit are the same; when a touch occurs, the sensing signal of the force sensor at the touch position will be changed, thus the sensing circuit may discriminate the force sensor with a changed sensing signal, and determine, based on a scanning mode of the scanning circuit, for example, a progressive scanning mode of the scanning circuit at a certain frame frequency, the touch position according to coordinates of the force sensor with the changed sensing signal.

When the touch object applies a pressure to the touch panel in a direction perpendicular to a major surface of the touch panel (first time), the four sensing electrodes at the touch position are arranged symmetrically about the directional electrode as a center, and thus will generate a same sensing signal. When the touch object applies a force, which is parallel to a major surface of the touch panel and tends to incur a horizontal movement, to the touch panel (second time), the triggering substrate is driven, under a static friction, by the force tending to incur a horizontal movement at the touch position, so as to move in the same direction as the direction of the force, thereby driving the directional electrode 101 on the triggering substrate to move. For example, the directional electrode 101 moves away from the center position in a direction towards the fourth sensing electrode 204. Due to movement of the directional electrode 101, distances between the directional electrode and the four sensing electrodes are changed, so the sensing signals of the respective sensing electrodes will be changed. The sensing circuit acquires four sensing signals and compares the acquired four sensing signals so as to determine the movement direction of the directional electrode 101.

Specifically, based on the voltage induction principle, when a distance of the directional electrode 101 from the fourth sensing electrode 204 is reduced, the sensing voltage of the fourth sensing electrode 204 tends to approximate to the voltage of the directional electrode 101. Similarly, when distances of the directional electrode 101 from other three sensing electrodes are increased, the sensing voltages of the three sensing electrodes will be reduced. Thus, the sensing circuit can determine the sensing electrode with increased sensing voltage by comparing the four sensing voltages and thus determine the movement direction of the directional electrode 101 is a direction towards the fourth sensing electrode 204, thereby determining the direction of the force applied to the sensing electrode and tending to incur a horizontal movement is the direction towards the fourth sensing electrode 204. Further, the magnitude of the force tending to incur a horizontal movement may also be determined according to an amount of increase in the sensing voltage.

Figure 17A:
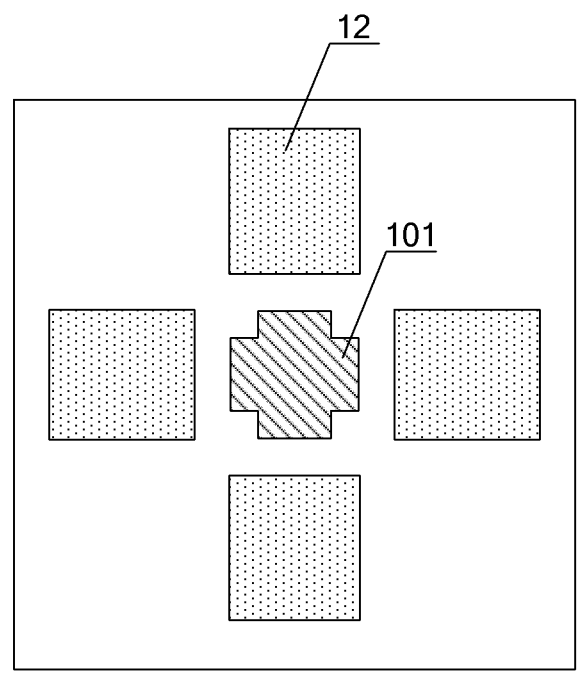
FIG. 17a is a plan view showing a triggering substrate and an arrangement of electrodes on the triggering substrate in a force sensor according to an embodiment of the present disclosure.
Figure 17B:
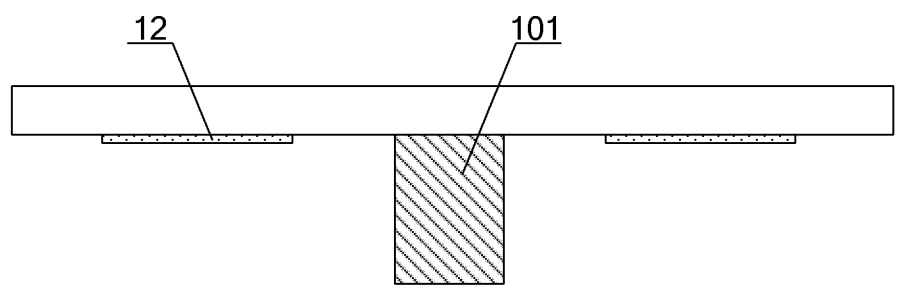

FIG. 17a is a plan view showing a configuration on a triggering substrate in a force sensor according to an embodiment of the present disclosure, and FIG. 17b is a cross sectional view of the configuration shown in FIG. 17a. As shown in FIG. 17a and FIG. 17b, the triggering substrate in this embodiment is used as the first substrate, on which a columnar direction electrode 101 and a film-shaped lubrication layer 12 are provided. In an example, the triggering substrate is used to receive a touch from a touch object, and is driven to move under a force applied by the touch object and tending to incur a horizontal movement so as to bring the directional electrode 101 to move, thereby changing distances between the directional electrode 101 and four sensing electrodes provided on the transmission substrate. After the triggering substrate and the transmission substrate are aligned and engaged with each other, the directional electrode 101 is located among the four sensing electrodes, and a voltage signal applied on the directional electrode 101 induces the four sensing electrodes to generate sensing voltages respectively. The lubrication layer 12 is in contact with the four sensing electrodes so as to reduce a friction for relative movement between the triggering substrate and the transmission substrate.

Figure 18A:
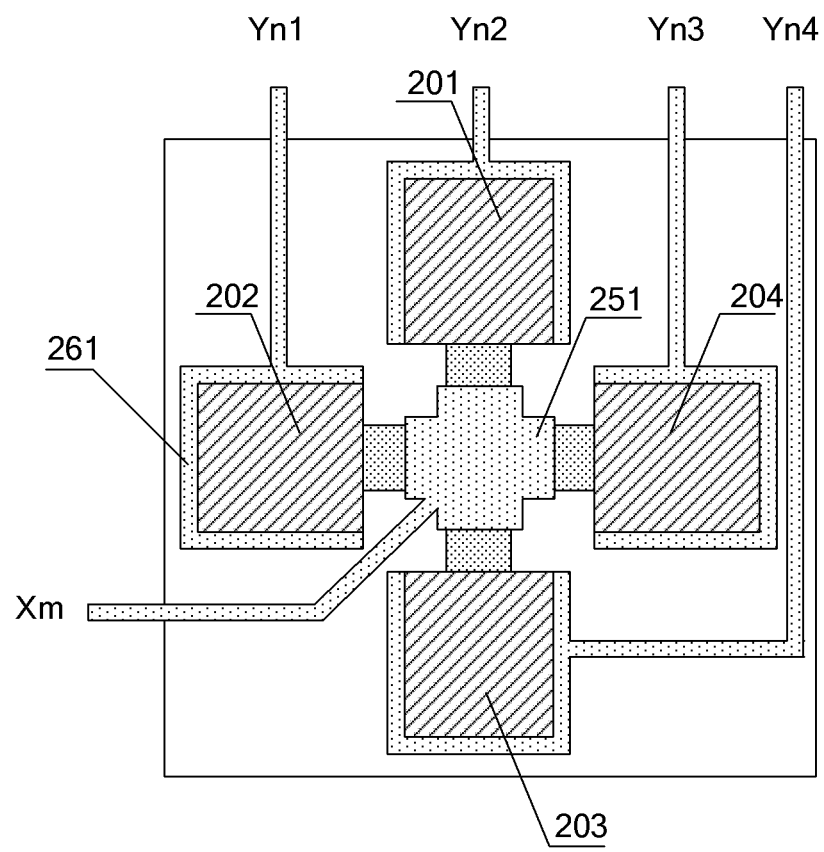
FIG. 18a is a plan view showing a transmission substrate and an arrangement of electrodes on the transmission substrate in a force sensor according to an embodiment of the present disclosure.
Figure 18B:
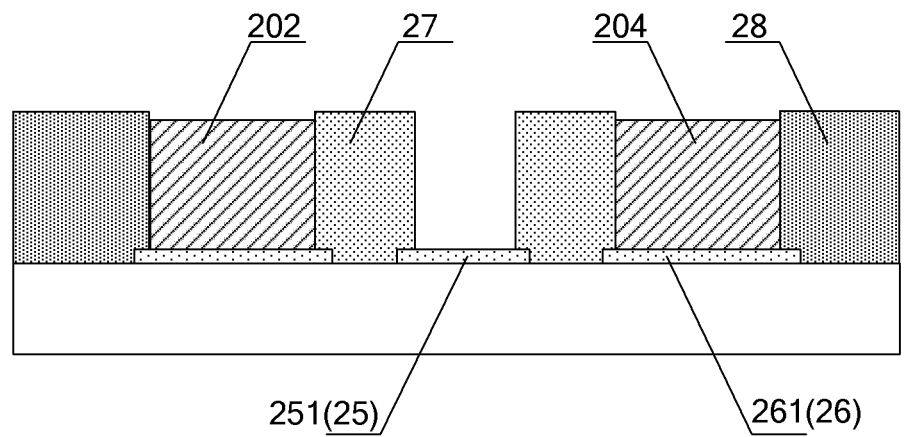

FIG. 18a is a plan view showing a configuration on a transmission substrate in a force sensor according to an embodiment of the present disclosure, and FIG. 18b is a cross sectional view of the configuration shown in FIG. 18a. As shown in FIG. 18a and FIG. 18b, the transmission substrate in this embodiment is used as the second substrate, and the force sensor further comprises a scanning signal transmission layer 25, a sensing signal transmission layer 26, a dielectric layer 27 and an insulation layer 28 provided on the transmission substrate, and four columnar sensing electrodes provided on the sensing signal transmission layer 26 and including a first sensing electrode 201, a second sensing electrode 202, a third sensing electrode 203 and a fourth sensing electrode 204. In an example, a film-shaped scanning signal transmission layer 25 is provided on the transmission substrate and comprises a scan connection electrode 251 and a scan leading-out line Xm connected with each other, and the scan connection electrode is located at a center of an arrangement of four sensing electrodes, such that after the triggering substrate and the transmission substrate are aligned and engaged with each other, the scan connection electrode electrically contacts with or is electrically connected with the directional electrode 101 on the triggering substrate, and the directional electrode 101 is electrically connected with the scanning circuit (see FIG. 1) by the scan connection electrode and the scan leading-out line Xm so as to receive a voltage signal applied from the scanning circuit. A film-shaped sensing signal transmission layer 26 is provided on the transmission substrate, and comprises four sensing connection electrodes 261 and four sense leading-out lines Yn (including a first sense leading-out line Yn1, a second sense leading-out line Yn2, a third sense leading-out line Yn3 and a fourth sense leading-out line Yn4), and each sensing connection electrode is electrically connected with one sense leading-out line. Four columnar sensing electrodes (including a first sensing electrode 201, a second sensing electrode 202, a third sensing electrode 203 and a fourth sensing electrode 204) are provided on the four sensing connection electrodes respectively, such that each sensing electrode is electrically connected with the sensing circuit by one sensing connection electrode and one sense leading-out line, and a sensing voltage generated by each sensing electrode is transmitted to the sensing circuit by one sensing connection electrode and one sense leading-out line. A dielectric layer 27 is provided on the transmission substrate and comprises four dielectric blocks, and each dielectric block is located between the directional electrode and one of the four sensing electrodes after the triggering substrate and the transmission substrate are aligned and engaged with each other. The insulation layer 28 is provided on the transmission substrate and around the four sensing electrodes. Functions of the lubrication layer 12, the dielectric layer 27 and the insulation layer 28 are the same as those described in above embodiments and will not repeatedly described here.

A process of manufacturing the force sensor in this embodiment is similar to those described in above embodiments, and mainly comprises: (1) providing a triggering substrate and a transmission substrate, and forming sensing electrodes and a directional electrode on the triggering substrate and the transmission substrate respectively; (2) aligning and engaging the triggering substrate and the transmission substrate on which corresponding electrodes are formed. Exemplarily, the process comprises forming a lubrication layer and the directional electrode on the triggering substrate sequentially; the process further comprises: on the transmission substrate, firstly forming patterns of a scanning signal transmission layer and a sensing signal transmission layer, then forming a pattern of four sensing electrodes, and finally forming patterns of a dielectric layer and an insulation layer. The aligning and engaging process, and materials and thicknesses of respective layers or films in this process are the same as or similar to those described in the above embodiments and will not repeatedly described here.

A further embodiment of the present disclosure provides a force sensor, where four sensing electrodes are provided on a triggering substrate while one directional electrode is provided on a transmission substrate. In addition, configurations of this embodiment may be extended in similar ways. For example, the dielectric layer may be provided on the triggering substrate. As another example, the sensing signal transmission layer may be provided on the triggering substrate. In some other examples, the scanning signal transmission layer and the sensing signal transmission layer may be provided on the triggering substrate; and so on. Relevant configurations may refer to the above embodiments and will not be repeatedly described here. Further, in other embodiments, the force sensor may comprise two sensing electrodes and one directional electrode, the two sensing electrodes are arranged symmetrically about the directional electrode as a center, and sensing electrodes of different force sensors have different arrangement directions. Relevant configurations may refer to the above embodiments and will not be repeatedly described here.

An embodiment of the present disclosure provides a method of manufacturing a force sensor, comprising following steps:

step S1: providing a first substrate and a second substrate, and forming a sensing electrode on one of the first substrate and the second substrate and a directional electrode on the other of the first substrate and the second substrate, the sensing electrode being configured to generate, under induction of a voltage applied to the directional electrode, a sensing signal associated with relative positions between the sensing electrode and the directional electrode; and step S2: aligning and engaging the first substrate and the second substrate with each other, such that the sensing electrode and the directional electrode are located between the first substrate and the second substrate, and that the first substrate is movable relative to the second substrate in response to being applied with a force tending to incur a horizontal movement, so as to enable a relative movement between the sensing electrode and the directional electrode corresponding to a direction and/or a magnitude of the force tending to incur a horizontal movement and changing the relative positions.

In an example, the step S1 comprises: forming the sensing electrode on the first substrate, and forming the directional electrode on the second substrate. The sensing electrode and the directional electrode may be formed by using an appropriate patterning process.

In an example, the step S1 comprises: forming, on the first substrate, a columnar sensing electrode, and a lubrication layer for reducing a friction for the relative movement between the first substrate and the second substrate.

As described above, a sequence of forming the lubrication layer and the sensing electrode may be set as required.

In an example, the step S1 further comprises: forming a scanning signal transmission layer and a sensing signal transmission layer on the second substrate; forming a plurality of columnar directional electrodes on the scanning signal transmission layer; and forming a dielectric layer and an insulation layer.

In an example, the step S2 comprises: aligning and engaging the first substrate and the second substrate with each other with surfaces of the first substrate and the second substrate on which the sensing electrode and the directional electrode are formed respectively facing towards each other, such that the plurality of directional electrodes are arranged symmetrically about the sensing electrode as a center, and that when the first substrate is moved relative to the second substrate under a force caused by the touch action and tending to incur a horizontal movement, the sensing electrode generates, under induction of a voltage signal applied to the directional electrode, a sensing signal associated with relative positions between the sensing electrode and the directional electrode, the sensing signal can be used for determining the touch position of the touch action and a direction and/or a magnitude of the force applied at the touch position and tending to incur a horizontal movement.

In other embodiments, the step S1 may comprise: forming a plurality of directional electrodes on the first substrate, and forming one sensing electrode on the second substrate; or, forming one directional electrode on the first substrate, and forming a plurality of sensing electrodes on the second substrate; or, forming a plurality of sensing electrodes on the first substrate, and forming one directional electrode on the second substrate. Specific arrangement and numbers of the sensing electrode and the directional electrode may refer to those described in above embodiments, and will not be repeatedly described here.

An embodiment of the present disclosure further provides a driving method for a touch panel. The touch panel may be one of those described in the above embodiments, and comprises a scanning circuit, a sensing circuit and a plurality of force sensors arranged in an array, each force sensor comprises a directional electrode and a sensing electrode, the scanning circuit is electrically connected with the directional electrode of each force sensor, and the sensing circuit is electrically connected with the sensing electrode of each force sensor. The driving method comprises:

inputting a voltage signal to the directional electrode of each of force sensors in a row by the scanning circuit in a progressive scanning mode;

by the sensing circuit, acquiring in real time a sensing signal from the sensing electrode of each of the force sensors in the row, and determining, according to the sensing signal, a touch position and a direction and/or a magnitude of a force applied at the touch position and tending to incur a horizontal movement.

Embodiments of the present disclosure provide a force sensor and a method of manufacturing the same, a touch panel and a touch display panel, where the first substrate and the second substrate are arranged opposite to each other, such that the first substrate is movable relative to the second substrate, when being subject to a force tending to incur a horizontal movement, thereby not only the touch position may be determined, but also the force applied at the touch position and tending to incur a horizontal movement may be sensed. By sensing the applied force tending to incur a horizontal movement, a touch intention of a user may be recognized, such that the user may make a touch operation without moving the touch object, thereby diversity in the human-computer interaction may be greatly enriched and the touch control technology may be extended to a multi-dimension domain.

It should be understood that in description of the embodiments of the present disclosure, terms such as "middle", "up", "down", "front", "rear", "vertical", "horizontal", "top", "bottom", "inner", "outer" and the like refer to orientation or position relationships described with reference to the drawings, are only used for facilitating and simplifying description of the present disclosure, and are not intended to indicate or imply the stated device or element must have a particular orientation, or be configured and operated at a particular orientation, and thus should not be interpreted as being limitative to the present disclosure.

It is noted that in description of the embodiments of the present disclosure, unless otherwise explicitly specified and defined, terms such as "mount", "couple", "connect" should be understood in a broad sense, for example, may refer to a fixed connection, may also be a detachable connection, or may be an integrated connection; may be a mechanical connection, or may be an electrical connection; may be a direct connection, or may be an indirect connection via an intermediate medium, or may be an internal communication between two elements. For those skilled in the art, specific meanings of these terms in the present disclosure may be understood depending on specific conditions.

The above described contents are merely exemplary embodiments of the disclosure, and the scope of the present disclosure is not limited thereto. Changes or alternations which are easily made by those skilled in the art should fall within the scope of the disclosure. Therefore, the scope of the disclosure should be solely defined by the scope of claims and equivalents thereof.

What is claimed is:

1. A force sensor, comprising a first substrate and a second substrate opposite to each other, a sensing electrode on one of the first substrate and the second substrate, and a directional electrode on the other one of the first substrate and the second substrate,
   wherein, the first substrate is movable relative to the second substrate in response to being applied with a force by a touch action from a touch object and tending to incur a horizontal movement, so as to enable a relative movement between the sensing electrode and the directional electrode corresponding to at least one of a direction and a magnitude of the force and changing a relative position of the sensing electrode with respect to the directional electrode, and
   the sensing electrode is configured to generate, under induction of a voltage signal applied to the directional electrode, a sensing signal associated with the relative position and used for determining a touch position of the touch action and at least one of the direction and the magnitude of the force applied by the touch action at the touch position, and wherein
   the force sensor further comprises a lubrication layer on the first substrate or the second substrate and for reducing a friction for the relative movement between the first substrate and the second substrate, the lubrication layer being in contact with the sensing electrode or the directional electrode on one of the first substrate and the second substrate opposite to the lubrication layer.

2. The force sensor according to claim 1, wherein
   one said sensing electrode is on a surface of the first substrate facing the second substrate while a plurality of said directional electrodes are on a surface of the second substrate facing the first substrate; or, a plurality of said directional electrodes are on the surface of the first substrate facing the second substrate while one said sensing electrode is on the surface of the second substrate facing the first substrate;
   the plurality of sensing electrodes are arranged to be center symmetrical with the directional electrode as a center of symmetry; and
   the sensing electrode is configured to, under induction of the voltage signal applied to the directional electrode and in response to a movement of the first substrate relative to the second substrate under the force, generate, by sensing a distance between the sensing electrode and the directional electrode, the sensing signal for determining the touch position of the touch action and at least one of the direction and the magnitude of the force applied at the touch position.

3. The force sensor according to claim 2, further comprising a plurality of scan leading-out lines for applying different voltage signals to the plurality of directional electrodes respectively and a sense leading-out line for acquiring the sensing signal from the sensing electrode, the sense leading-out line being electrically connected with the sensing electrode, each of the plurality of scan leading-out lines being electrically connected with one of the plurality of directional electrodes.

4. The force sensor according to claim 3, wherein
the plurality of scan leading-out lines and the sense leading-out line are on the first substrate or the second substrate; and
the sense leading-out line is electrically connected with the sensing electrode by a sensing connection electrode, and each of the plurality of scan leading-out lines is electrically connected with one of the plurality of directional electrodes by a scan connection electrode.

5. The force sensor according to claim 2, wherein the number of the plurality of directional electrodes is in a range from two to eight.

6. The force sensor according to claim 1, wherein
one said directional electrode is on a surface of the first substrate facing the second substrate while a plurality of said sensing electrodes are on a surface of the second substrate facing the first substrate; or, a plurality of said sensing electrodes are on the surface of the first substrate facing the second substrate while one said directional electrode is on the surface of the second substrate facing the first substrate;
the plurality of sensing electrodes are arranged to be center symmetrical with the directional electrode as a center of symmetry; and
the sensing electrode is configured to, under induction of the voltage signal applied to the directional electrode and in response to movement of the first substrate relative to the second substrate under the force, generate, by sensing a distance between the sensing electrode and the directional electrode, the sensing signal for determining the touch position of the touch action and at least one of the direction and the magnitude of the force applied at the touch position.

7. The force sensor according to claim 6, further comprising a scan leading-out line for applying the voltage signal to the directional electrode and a plurality of sense leading-out lines for acquiring sensing signals from the plurality of sensing electrodes respectively, each of the plurality of sense leading-out lines being electrically connected with one of the plurality of sensing electrodes, the scan leading-out line being electrically connected with the directional electrode.

8. The force sensor according to claim 7, wherein
the scan leading-out line and the plurality of sense leading-out lines are on the first substrate or the second substrate; and
each of the plurality of the sense leading-out lines is electrically connected with one of the plurality of the sensing electrodes by a sensing connection electrode, and the scan leading-out line is electrically connected with the directional electrode by a scan connection electrode.

9. The force sensor according to claim 6, wherein the number of the plurality of sensing electrodes is in a range from two to eight.

10. The force sensor according to claim 1, further comprising a dielectric layer, the dielectric layer being on the first substrate or the second substrate and comprising a plurality of dielectric blocks, each of the plurality of dielectric blocks being between the sensing electrode and the directional electrode.

11. The force sensor according to claim 1, further comprising an insulation layer on the first substrate or the second substrate, the insulation layer being at an outer side of the sensing electrode or the directional electrode.

12. The force sensor according to claim 1, wherein at least one of the sensing electrode and the directional electrode is a columnar electrode extending between the first substrate and the second substrate.

13. A touch panel, comprising a plurality of said force sensors of claim 1 arranged in an array, wherein the touch panel further comprises:
a scanning circuit configured to input a voltage signal to each of the plurality of said force sensors in a scanning mode; and
a sensing circuit configured to acquire a sensing signal from each of the plurality of said force sensors, and to determine, according to the sensing signal, a touch position of a touch object on the touch panel and at least one of a direction and a magnitude of a force applied by the touch object at the touch position and tending to incur a horizontal movement.

14. A touch display panel, comprising a display panel and the touch panel of claim 13.

15. A method of manufacturing a force sensor, comprising:
providing a first substrate and a second substrate, and forming a sensing electrode on one of the first substrate and the second substrate and a directional electrode on the other one of the first substrate and the second substrate;
aligning and engaging the first substrate and the second substrate with each other, such that the first substrate is movable relative to the second substrate in response to being applied with a force by a touch action from a touch object and tending to incur a horizontal movement, so as to enable a relative movement between the sensing electrode and the directional electrode corresponding to at least one of a direction and a magnitude of the force and changing a relative position of the sensing electrode with respect to the directional electrode, the sensing electrode being configured to generate, under induction of a voltage signal applied to the directional electrode, a sensing signal associated with the changed relative position and used for determining a touch position of the touch action and at least one of the direction and the magnitude of the force applied at the touch position,
forming a lubrication layer on the first substrate or the second substrate, the lubrication layer being configured for reducing a friction for the relative movement between the first substrate and the second substrate and for being in contact with the sensing electrode or the directional electrode on one of the first substrate and the second substrate opposite to the lubrication layer.

16. The method according to claim 15, wherein forming a sensing electrode on one of the first substrate and the second substrate and a directional electrode on the other of the first substrate and the second substrate comprises:

forming one said sensing electrode on one of the first substrate and the second substrate and forming a plurality of said directional electrodes on the other of the first substrate and the second substrate; or, forming one said directional electrode on one of the first substrate and the second substrate and forming a plurality of said sensing electrodes on the other of the first substrate and the second substrate.

17. The method according to claim 16, wherein aligning and engaging the first substrate and the second substrate with each other comprises:

aligning and engaging the first substrate and the second substrate with each other with surfaces of the first substrate and the second substrate on which the sensing electrode and the directional electrode are formed respectively facing towards each other, such that the plurality of said directional electrodes are arranged to be center symmetrical with the one said sensing electrode as a center of symmetry or the plurality of said sensing electrodes are arranged to be center symmetrical with the directional electrode as a center symmetry, thereby under induction of the voltage signal applied to the directional electrode and in response to movement of the first substrate relative to the second substrate under the force, the sensing electrode generates, by sensing a distance between the sensing electrode and the directional electrode, the sensing signal for determining the touch position of the touch action and at least one of the direction and the magnitude of the force applied at the touch position.

18. The method according to claim 15, further comprising:

on the other of the first substrate and the second substrate on which the directional electrode is to be formed, forming a scanning signal transmission layer for applying the voltage signal to the directional electrode and a sensing signal transmission layer for acquiring and transmitting the sensing signal from the sensing electrode;

forming the directional electrode on the scanning signal transmission layer; and forming a dielectric layer and an insulation layer, the dielectric layer and the insulation layer being arranged such that after aligning and engaging the first substrate and the second substrate with each other, the dielectric layer is located between the sensing electrode and the directional electrode, and the insulation layer is located at an outer side of the sensing electrode or the directional electrode.

* * * * *